US012410911B2

(12) United States Patent
Osada et al.

(10) Patent No.: US 12,410,911 B2
(45) Date of Patent: Sep. 9, 2025

(54) WORK MACHINE

(71) Applicant: Koki Holdings Co., Ltd., Tokyo (JP)

(72) Inventors: Yoshiaki Osada, Ibaraki (JP); Takeru Kumakura, Ibaraki (JP); Ayaka Koizumi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 276 days.

(21) Appl. No.: 17/796,259

(22) PCT Filed: Dec. 25, 2020

(86) PCT No.: PCT/JP2020/048842
§ 371 (c)(1),
(2) Date: Jul. 28, 2022

(87) PCT Pub. No.: WO2021/153134
PCT Pub. Date: Aug. 5, 2021

(65) Prior Publication Data

US 2023/0076288 A1 Mar. 9, 2023

(30) Foreign Application Priority Data

Jan. 31, 2020 (JP) ................................. 2020-014326
Sep. 30, 2020 (JP) ................................. 2020-164779

(51) Int. Cl.
*F21V 33/00* (2006.01)
*B25F 5/00* (2006.01)
*B27C 5/10* (2006.01)

(52) U.S. Cl.
CPC .......... *F21V 33/0084* (2013.01); *B25F 5/008* (2013.01); *B27C 5/10* (2013.01)

(58) Field of Classification Search
None
See application file for complete search history.

(56) References Cited

U.S. PATENT DOCUMENTS 4,051,880 A * 10/1977 Hestily .............. B23Q 17/2404 408/67
5,525,842 A * 6/1996 Leininger ............ H02K 1/2713 290/43

(Continued)

FOREIGN PATENT DOCUMENTS

CN 204470650 7/2015
CN 105162306 12/2015

(Continued)

OTHER PUBLICATIONS

"International Search Report (Form PCT/ISA/210) of PCT/JP2020/048842," mailed on Apr. 6, 2021, with English translation thereof, pp. 1-4.

(Continued)

*Primary Examiner* — Tanzim Imam
(74) *Attorney, Agent, or Firm* — JCIPRNET

(57) ABSTRACT

A router includes an illumination part having an LED, and the illumination part is accommodated in an illumination accommodation portion of a holding ring and held by the holding ring. Here, a restriction portion of the holding ring is arranged adjacent to a lower side of a positioning rib of a stator and restricts downward movement of the stator. Thus, the illumination part can be held using the holding ring that restricts the downward movement of the stator. Accordingly, the illumination part can be mounted in the router using a member that holds the illumination part and a member that restricts the downward movement of the stator as a common (Continued)

member. In this manner, the periphery of a tip tool can be illuminated by the illumination part, while preventing an increase in the number of components.

18 Claims, 13 Drawing Sheets

(56) References Cited

U.S. PATENT DOCUMENTS

| | | | | |
|---|---|---|---|---|
| 6,443,675 | B1 | 9/2002 | Kopras et al. | |
| 10,836,019 | B2 * | 11/2020 | Matsushita | B25F 5/008 |
| 2003/0044251 | A1 * | 3/2003 | Lagaly | H01M 50/244 144/136.95 |
| 2004/0052600 | A1 * | 3/2004 | Pientka | B23Q 16/024 409/182 |
| 2008/0149222 | A1 * | 6/2008 | Zaiser | B27C 5/10 144/154.5 |
| 2010/0206432 | A1 * | 8/2010 | Pozgay | B27C 5/10 144/136.95 |
| 2011/0204786 | A1 * | 8/2011 | Schoen | B25F 5/00 290/1 R |
| 2012/0319509 | A1 | 12/2012 | Kishima et al. | |
| 2013/0021783 | A1 * | 1/2013 | Vanko | B25B 21/00 362/119 |
| 2017/0106520 | A1 * | 4/2017 | Schadow | B25F 3/00 |
| 2021/0197356 | A1 * | 7/2021 | Chung | B25F 5/008 |

FOREIGN PATENT DOCUMENTS

| | | |
|---|---|---|
| CN | 106715053 | 5/2017 |
| CN | 208468213 | 2/2019 |
| DE | 102011075663 | 11/2012 |
| JP | 2006326933 | 12/2006 |
| JP | 2014073536 | 4/2014 |
| JP | 2017526539 | 9/2017 |
| JP | 2019193971 | 11/2019 |

OTHER PUBLICATIONS

"Office Action of China Counterpart Application", issued on Jul. 29, 2023, with English translation thereof, pp. 1-15.

"Office Action of China Counterpart Application", issued on Dec. 5, 2022, with English translation thereof, pp. 1-17.

* cited by examiner (A)

(B)

WORK MACHINE

CROSS-REFERENCE TO RELATED APPLICATION

This application is a 371 application of the International PCT application serial no. PCT/JP2020/048842, filed on Dec. 25, 2020, which claims the priority benefits of Japan Patent Application No. 2020-014326, filed on Jan. 31, 2020, and Japan Patent Application No. 2020-164779, filed on Sep. 30, 2020. The entirety of each of the above-mentioned patent applications is hereby incorporated by reference herein and made a part of this specification.

TECHNICAL FIELD

The invention relates to a work machine.

RELATED ART

The following Patent Literature 1 discloses a router (work machine) that performs a cutting operation on a material to be cut through rotation of a tip tool driven by a motor. Specifically, the operator grasps a handle of the router and pushes the router downward, thereby bringing the tip tool into contact with the material to be cut and performing the cutting operation on the material to be cut. In addition, there are routers provided with an illumination part that illuminates the periphery of the tip tool in order to improve the workability during cutting.

CITATION LIST

Patent Literature

[Patent Literature 1] Japanese Patent Laid-Open No. 2006-326933

SUMMARY OF INVENTION

Technical Problem

Here, when the router described in Patent Literature 1 is equipped with an illumination part, it is necessary to separately provide a member for holding the illumination part. Therefore, the number of components may increase. Accordingly, when the illumination part is mounted on the router, it is desirable to have a structure that can illuminate the periphery of the tip tool while preventing an increase in the number of components. Further, when the illumination part is mounted, it is desirable to suppress deterioration of the assemblability.

In view of the above, the invention aims to provide a work machine that can illuminate the periphery of a tip tool while preventing an increase in the number of components. Further, the invention aims to provide a work machine that can illuminate the periphery of a tip tool while suppressing deterioration of the assemblability.

Solution to Problem

One or more embodiments of the invention provide a work machine, including: a motor including a rotating shaft, a rotor configured to be integrally rotatable on the rotating shaft, and a stator arranged on a radially outer side of the rotor; a fan provided on the rotating shaft and arranged on one axial side of the rotating shaft with respect to the rotor and the stator; a housing accommodating the motor; a tip tool attached to one axial end of the rotating shaft; an illumination part including a light source that irradiates emitted light toward a periphery of the tip tool; and a holding member provided on a radially outer side of the fan, and rectifying an air flow generated by the fan and holding the illumination part.

One or more embodiments of the invention provide a work machine, including: a motor including a rotating shaft, a rotor configured to be integrally rotatable on the rotating shaft, and a stator arranged on a radially outer side of the rotor; a housing accommodating the motor; a fan provided on the rotating shaft and arranged on one axial side of the rotating shaft with respect to the rotor and the stator; a tip tool attached to one axial end of the rotating shaft; an illumination part including a light source that irradiates emitted light toward a periphery of the tip tool; and a holding member provided on one axial side of the rotating shaft with respect to the stator, and holding the illumination part and restricting movement of the stator toward one axial side of the rotating shaft.

In one or more embodiments of the invention, the housing includes: a first housing accommodating the motor; and a second housing provided on one axial side of the rotating shaft with respect to the first housing. The holding member is sandwiched by the first housing and the second housing in an axial direction of the rotating shaft.

In one or more embodiments of the invention, an engaging portion engaged with the holding member is formed in the second housing, and rotation of the holding member in a circumferential direction of the rotating shaft is restricted by the engaging portion.

In one or more embodiments of the invention, the holding member includes: a base portion arranged between the rotor and the stator, and the fan; and an extension portion extending from the base portion to one axial side of the rotating shaft. The illumination part is held at a tip of the extension portion.

In one or more embodiments of the invention, the holding member includes: a base portion arranged between the rotor and the stator, and the fan; and an extension portion extending from the base portion to one axial side of the rotating shaft. The illumination part is held at a base end portion of the extension portion. The extension portion transmits light emitted by the light source, and the light is emitted from a tip of the extension portion toward the periphery of the tip tool.

In one or more embodiments of the invention, a groove that is opened to the other axial side of the rotating shaft is formed in the base portion, and wiring connected to the illumination part is arranged in the groove.

In one or more embodiments of the invention, the holding member holds a pair of the illumination parts, and wiring connecting the pair of the illumination parts is arranged in the groove.

In one or more embodiments of the invention, a split housing is provided on the other axial side of the rotating shaft with respect to the housing, and the split housing is configured to be splittable in a direction orthogonal to the axial direction of the rotating shaft.

In one or more embodiments of the invention, a controller that controls turning on and off of the illumination part is provided in the split housing.

In one or more embodiments of the invention, a battery that supplies electric power to the illumination part is detachably provided in the split housing.

One or more embodiments of the invention provide a work machine, including: a motor including a rotating shaft, a rotor configured to be integrally rotatable on the rotating shaft, and a stator arranged on a radially outer side of the rotor; a fan provided on the rotating shaft and arranged on one axial side of the rotating shaft with respect to the rotor and the stator; a housing accommodating the motor; a tip tool attached to one axial end of the rotating shaft; an illumination part including a light source that irradiates emitted light toward a periphery of the tip tool; and a holding member holding the illumination part. The holding member includes: a base portion arranged between the rotor and the stator, and the fan; and an extension portion extending from the base portion to one axial side of the rotating shaft and holding the illumination part, and transmitting light emitted by the light source and irradiating the light from a tip toward the periphery of the tip tool. The tip of the extension portion is arranged on one axial side of the rotating shaft with respect to the fan.

Effects of Invention

The work machine having the above configuration can illuminate the periphery of the tip tool while preventing an increase in the number of components.

Figure 3:
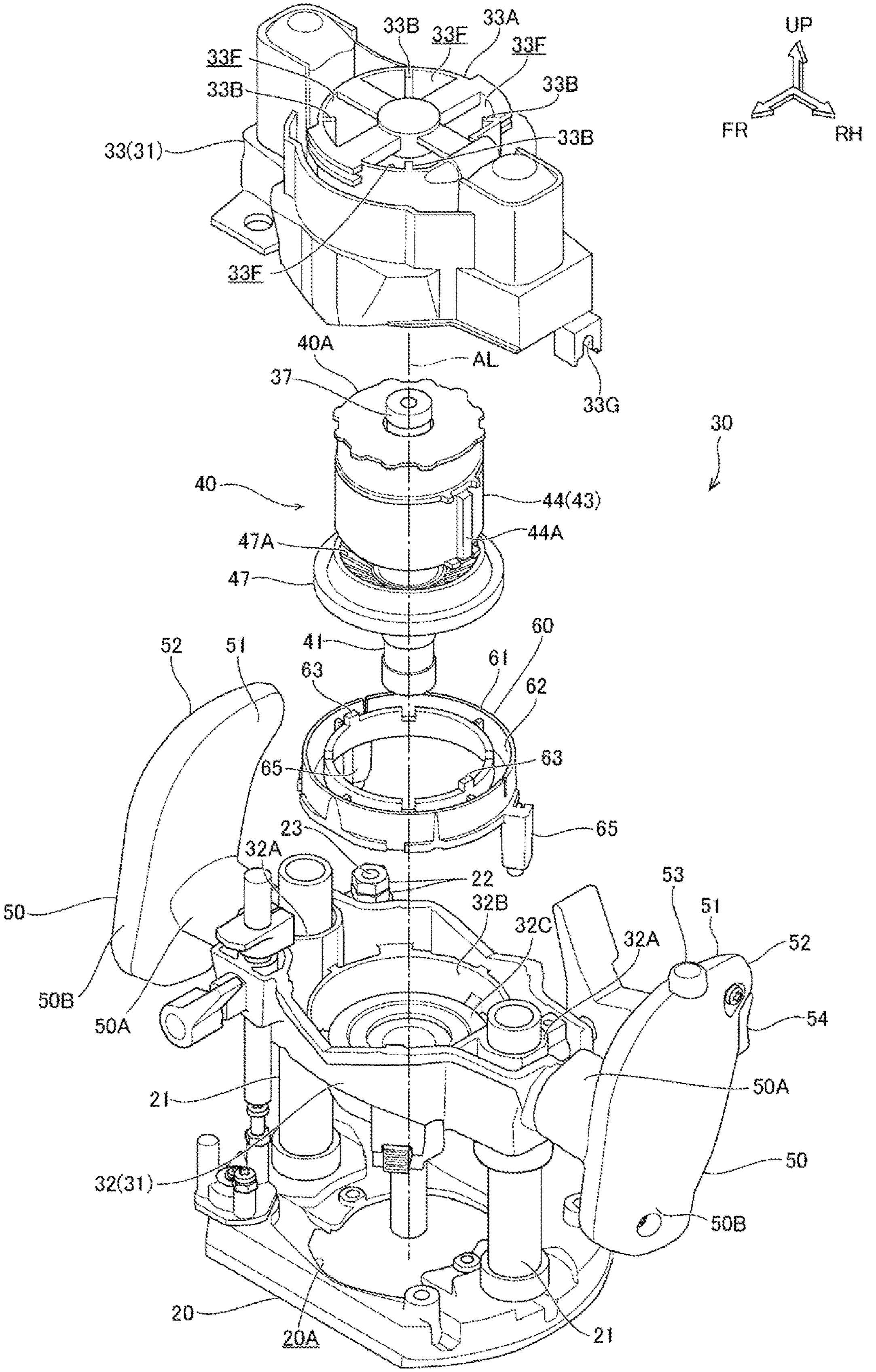
FIG. 3 is an exploded perspective view of the router main body of the router shown in FIG. 1 as viewed from the front diagonally to the right.
Figure 4:
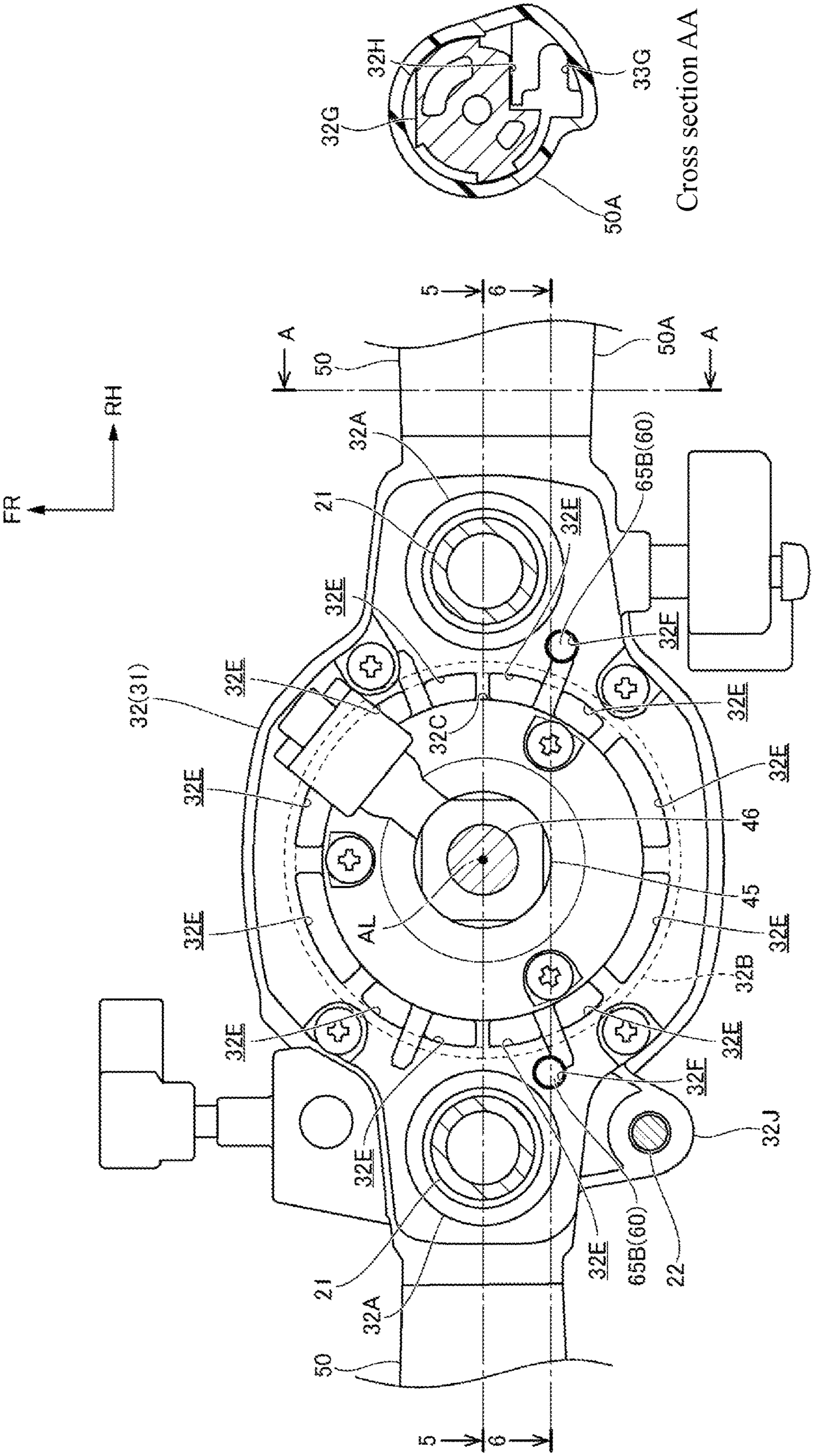
FIG. 4 is a cross-sectional view of the router shown in FIG. 1 as viewed from the lower side of the router main body (cross-sectional view taken along the line 4-4 of FIG. 1).
Figure 9:
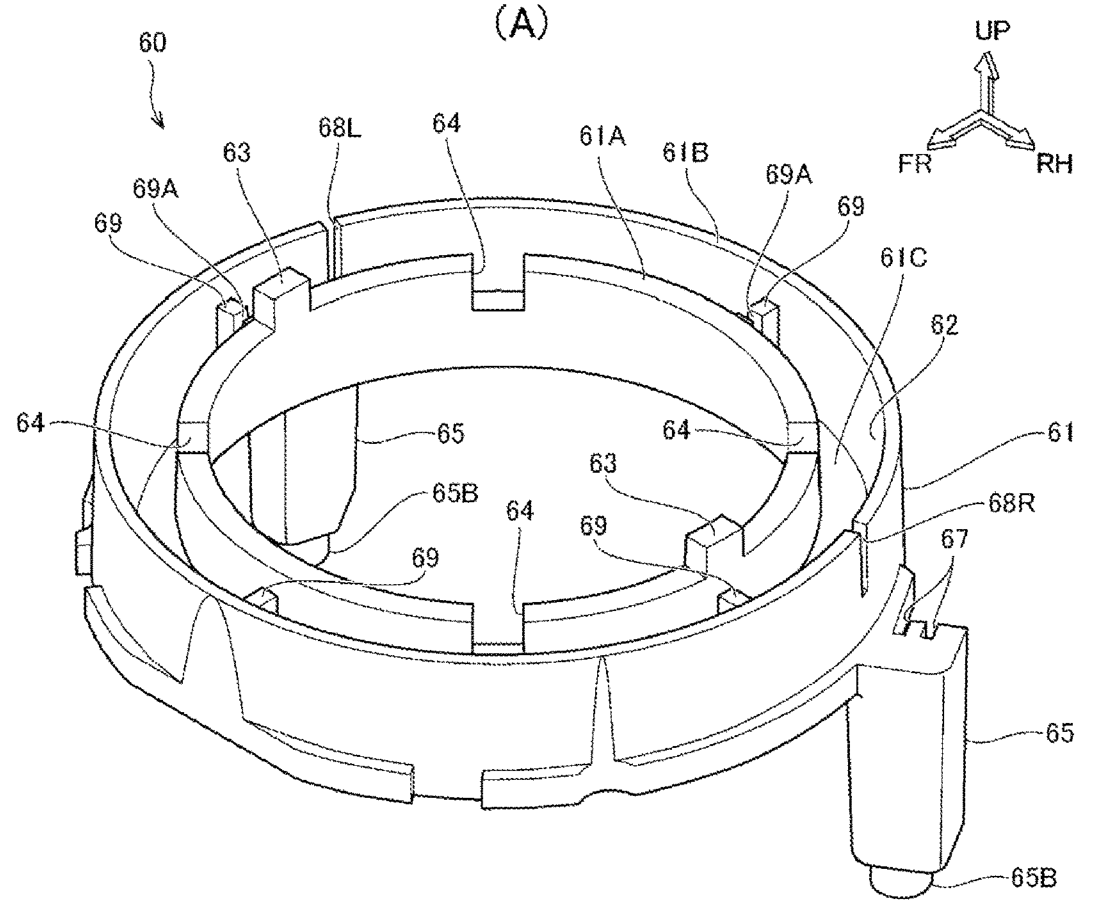
Figure 9:
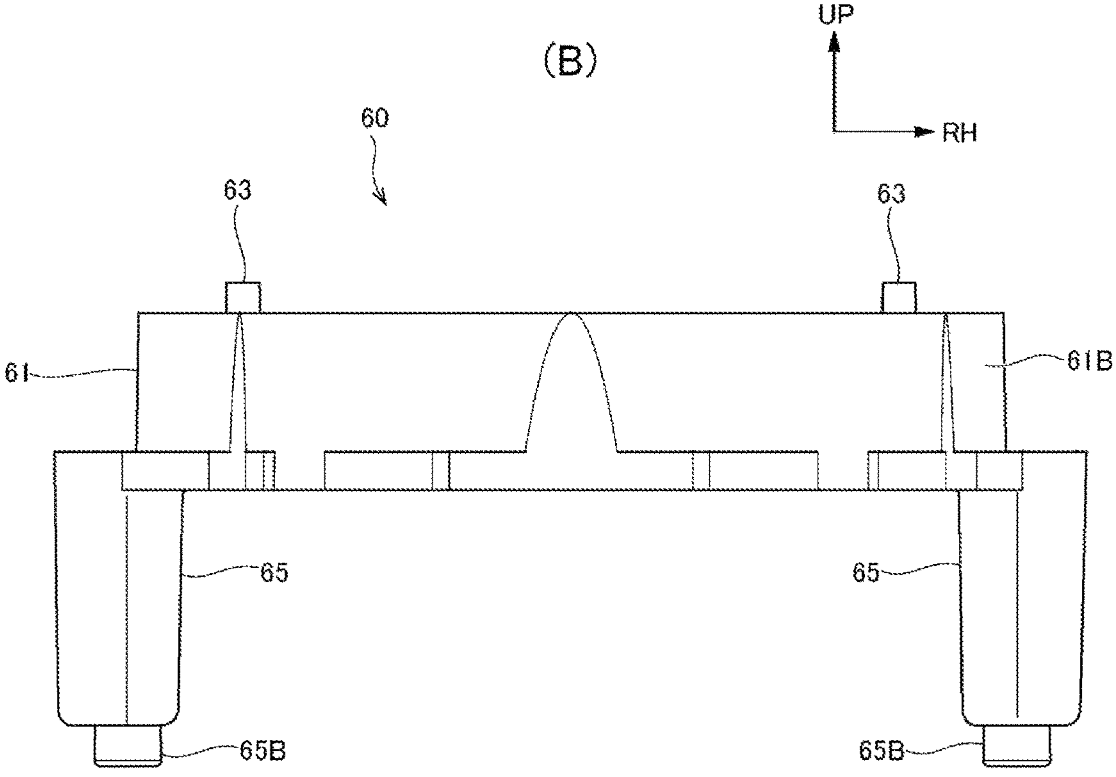

(A) of FIG. 9 is an enlarged perspective view showing the holding ring shown in FIG. 3, and (B) of FIG. 9 is a front view of the holding ring of (A) as viewed from the front side.

Figure 8:
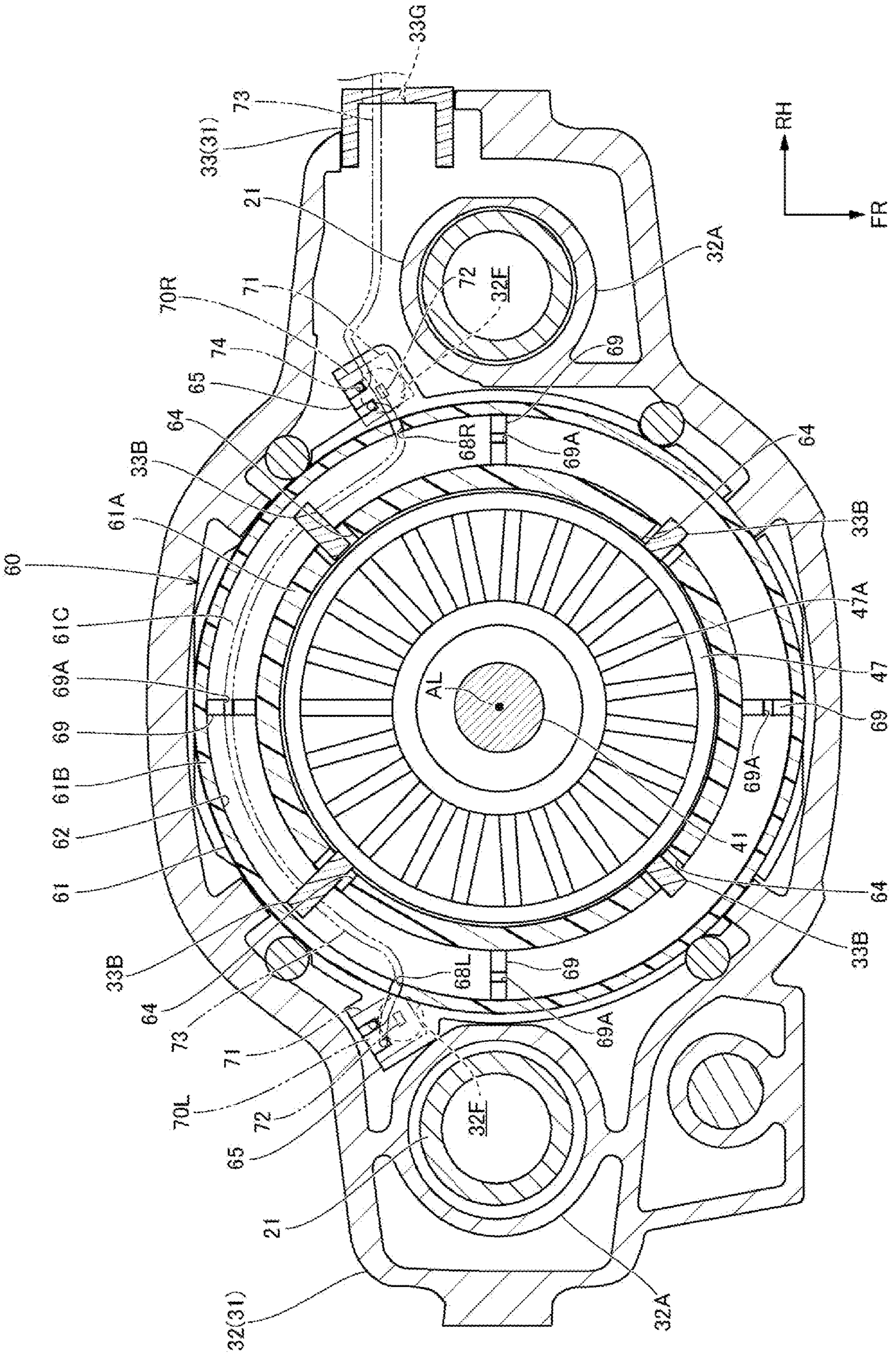
FIG. 8 is a plan cross-sectional view showing a state where the holding ring shown in FIG. 5 is accommodated in the end bracket at the position of the upper end of the holding ring as viewed from the upper side (cross-sectional view taken along the line 8-8 of FIG. 5).
Figure 10:
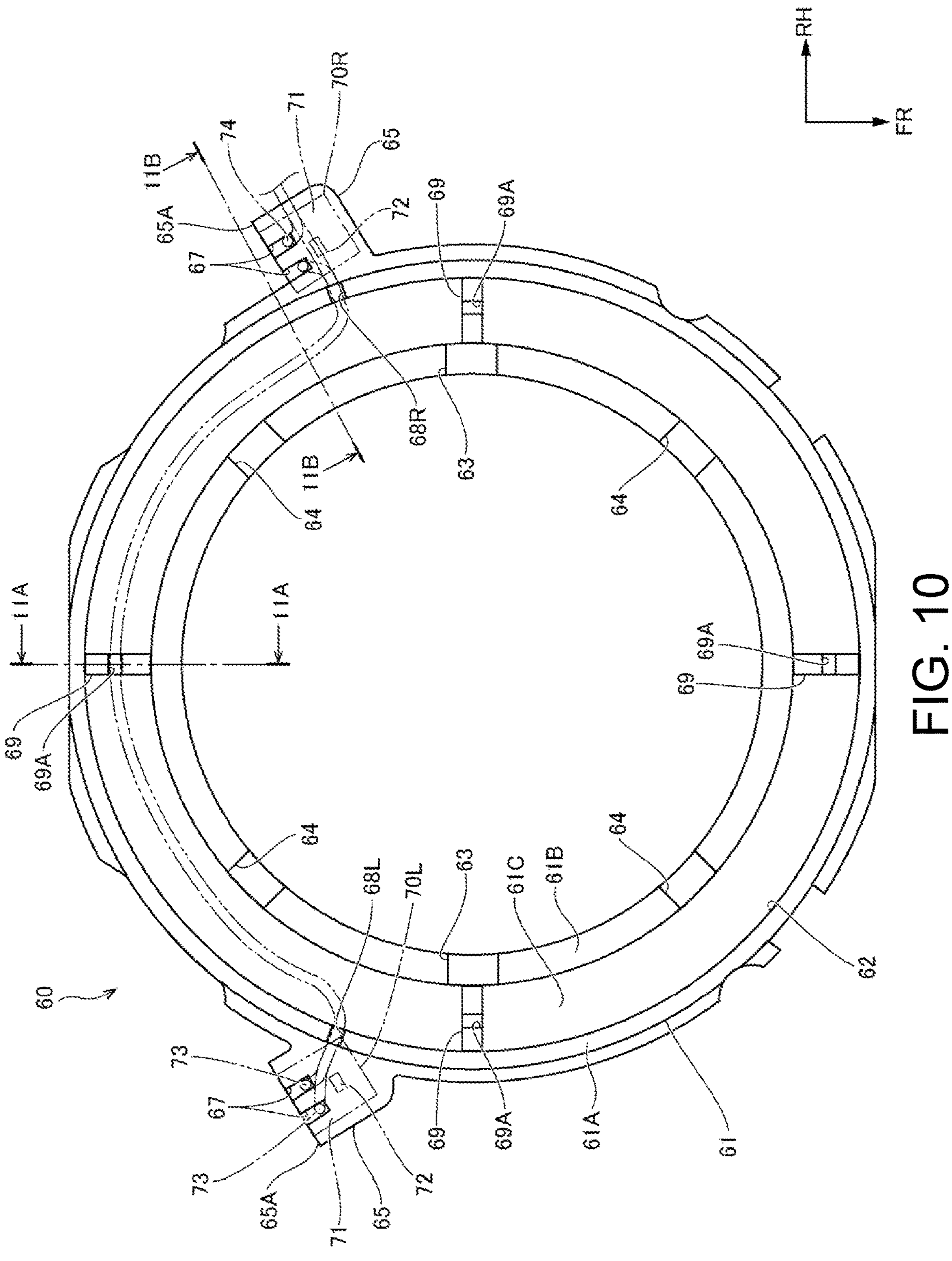

FIG. 10 is an enlarged plan view showing a state where the illumination part is held in the holding ring shown in FIG. 8 as viewed from the upper side.

Figure 11:
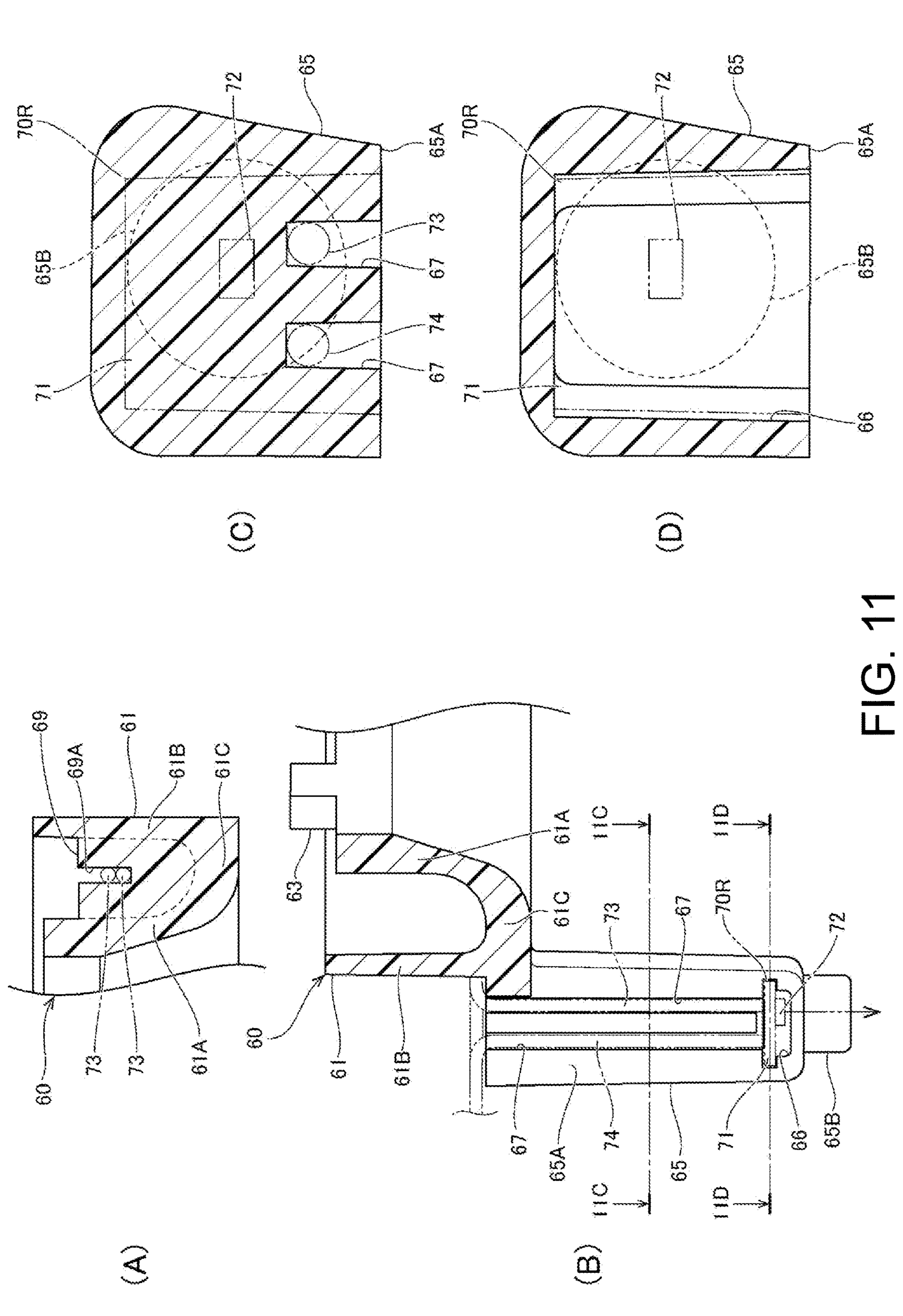

(A) of FIG. 11 is a cross-sectional view showing the ring base of the holding ring shown in FIG. 10 at the position of the reinforcing rib (cross-sectional view taken along the line 11A-11A of FIG. 10), and (B) of FIG. 11 is a cross-sectional view showing the holding ring shown in FIG. 10 around the holding pillar (cross-sectional view taken along the line 11B-11B of FIG. 10). (C) of FIG. 11 is a cross-sectional view showing the vertical intermediate portion of the holding pillar shown in (B) as viewed from the upper side (cross-sectional view taken along the line 11C-11C of (B) of FIG. 11), and (D) of FIG. 11 is a cross-sectional view showing the lower end of the holding pillar shown in (B) as viewed from the upper side (cross-sectional view taken along the line 11D-11D of (B) of FIG. 11).

Figure 6:
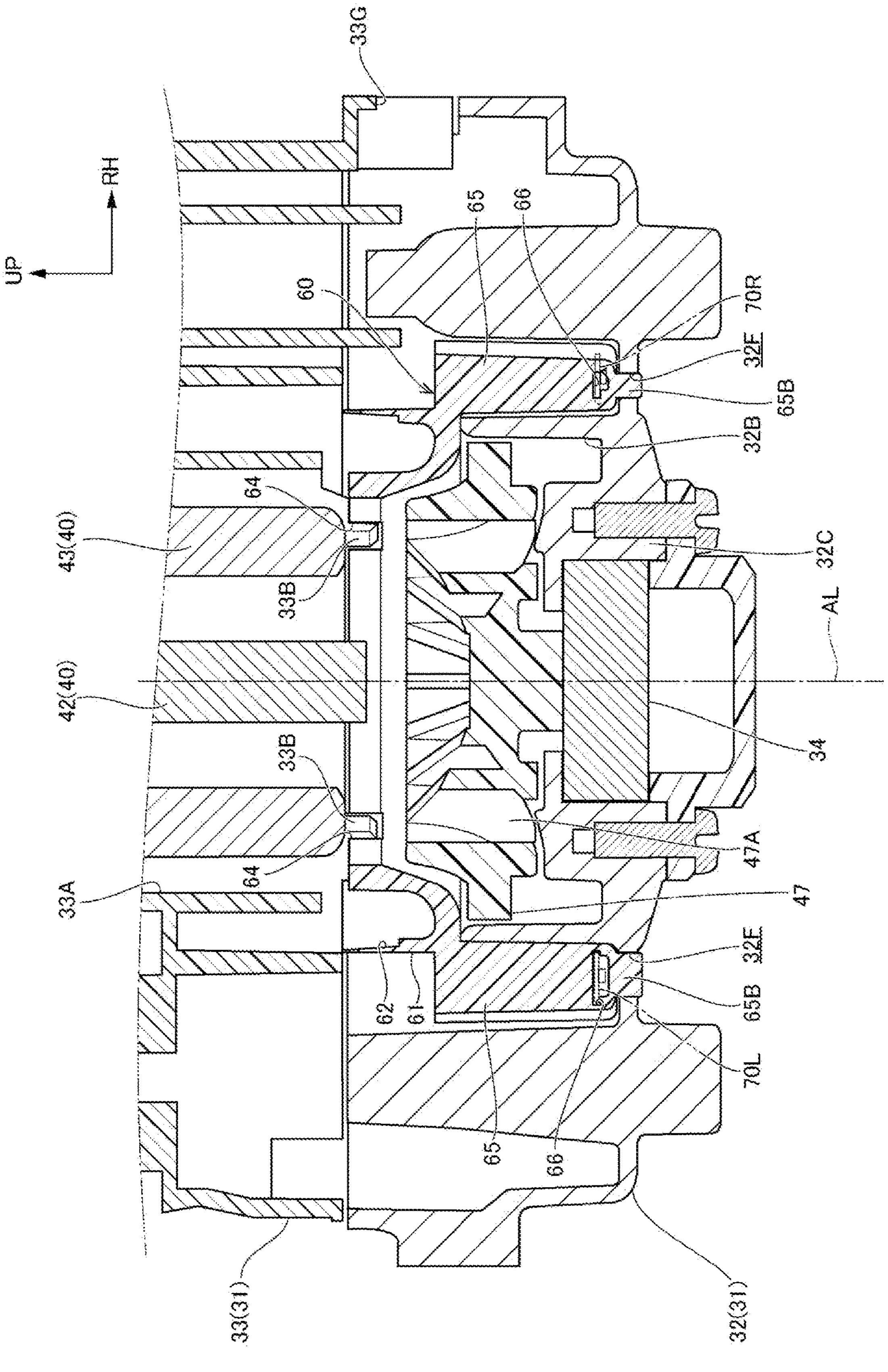
FIG. 6 is a cross-sectional view showing the inside of the router main body shown in FIG. 4 at the position of the illumination hole as viewed from the front side (cross-sectional view taken along the line 6-6 of FIG. 4).
Figure 12:
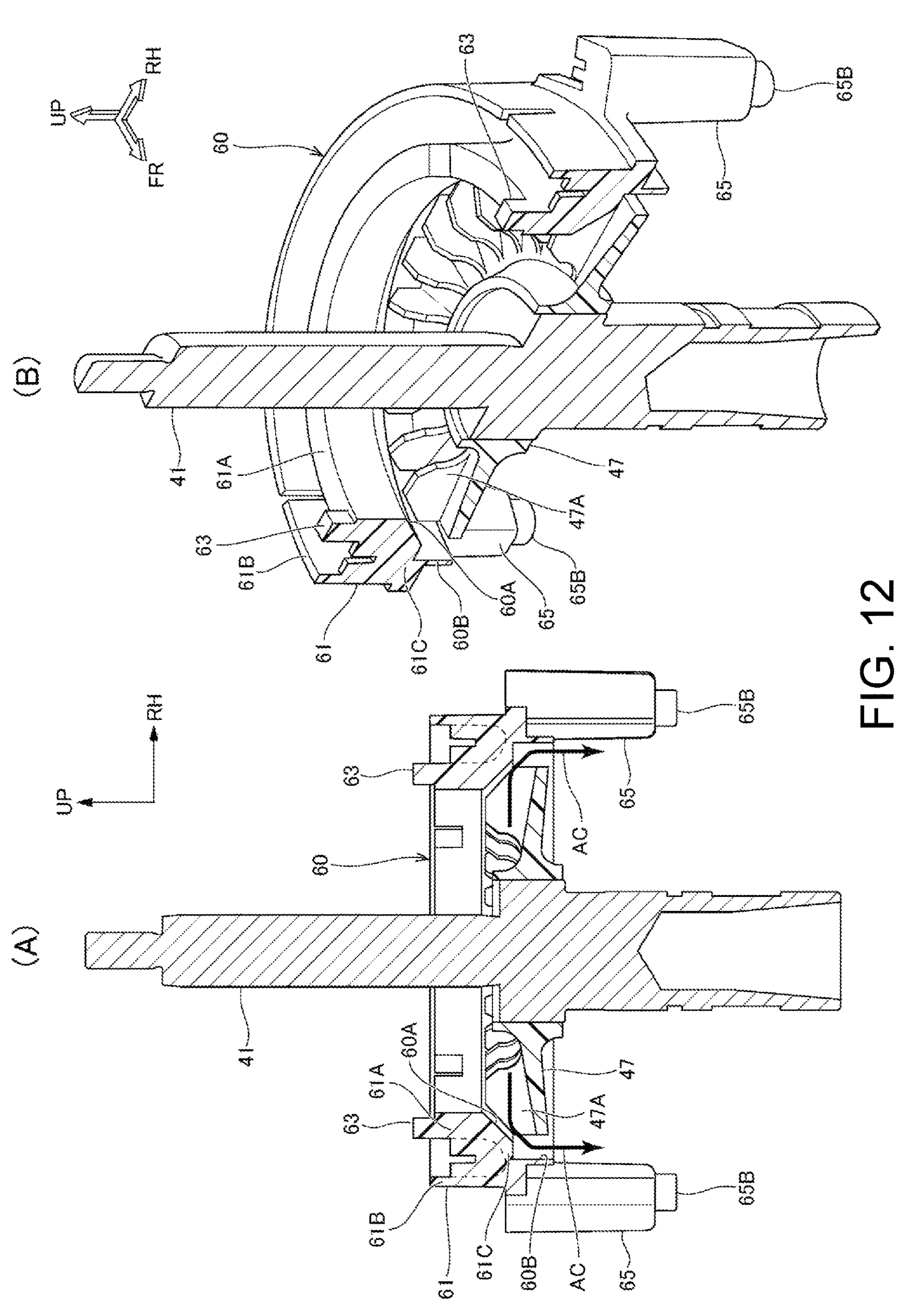

(A) of FIG. 12 is a cross-sectional view showing a modified example of the holding ring when the fan shown in FIG. 6 is a centrifugal fan as viewed from the front side, and (B) of FIG. 12 is a cross-sectional view showing the fan and the holding ring of (A) as viewed from the front diagonally to the right.

Figure 13:
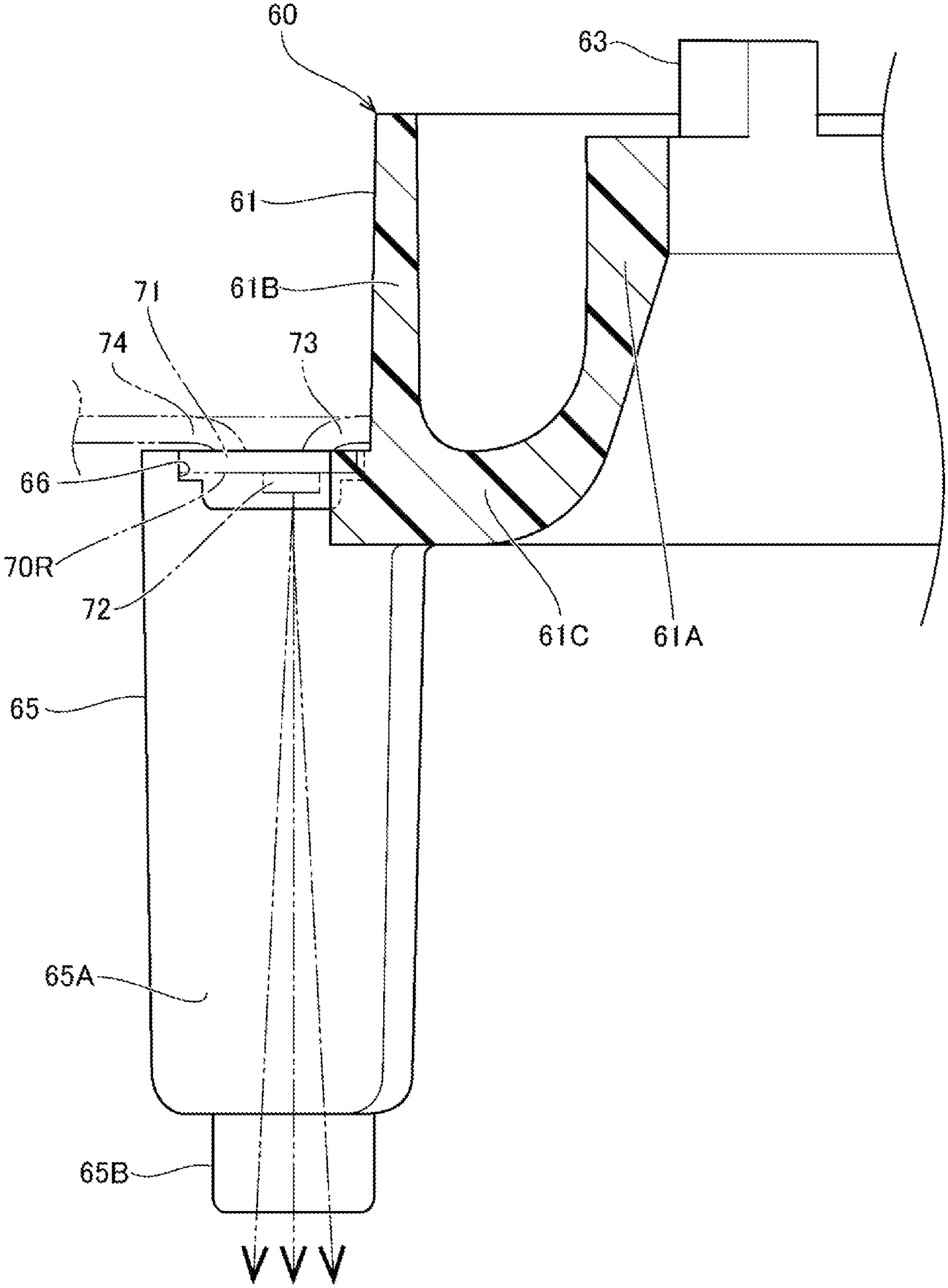

FIG. 13 is a cross-sectional view corresponding to (B) of FIG. 11 and showing a modified example of the holding ring when the vertical position of the illumination part shown in (B) of FIG. 11 is changed.

DESCRIPTION OF EMBODIMENTS

Hereinafter, a router 10 serving as a "work machine" according to the present embodiment will be described with reference to the drawings. The arrows UP, FR, and RH appropriately shown in the drawings indicate the upper side, the front side, and the right side of the router 10, respectively. In the following description, when the up-down, front-rear, and left-right directions are used, they indicate the up-down direction, front-rear direction, and left-right direction of the router 10 unless otherwise specified.

Figure 1:
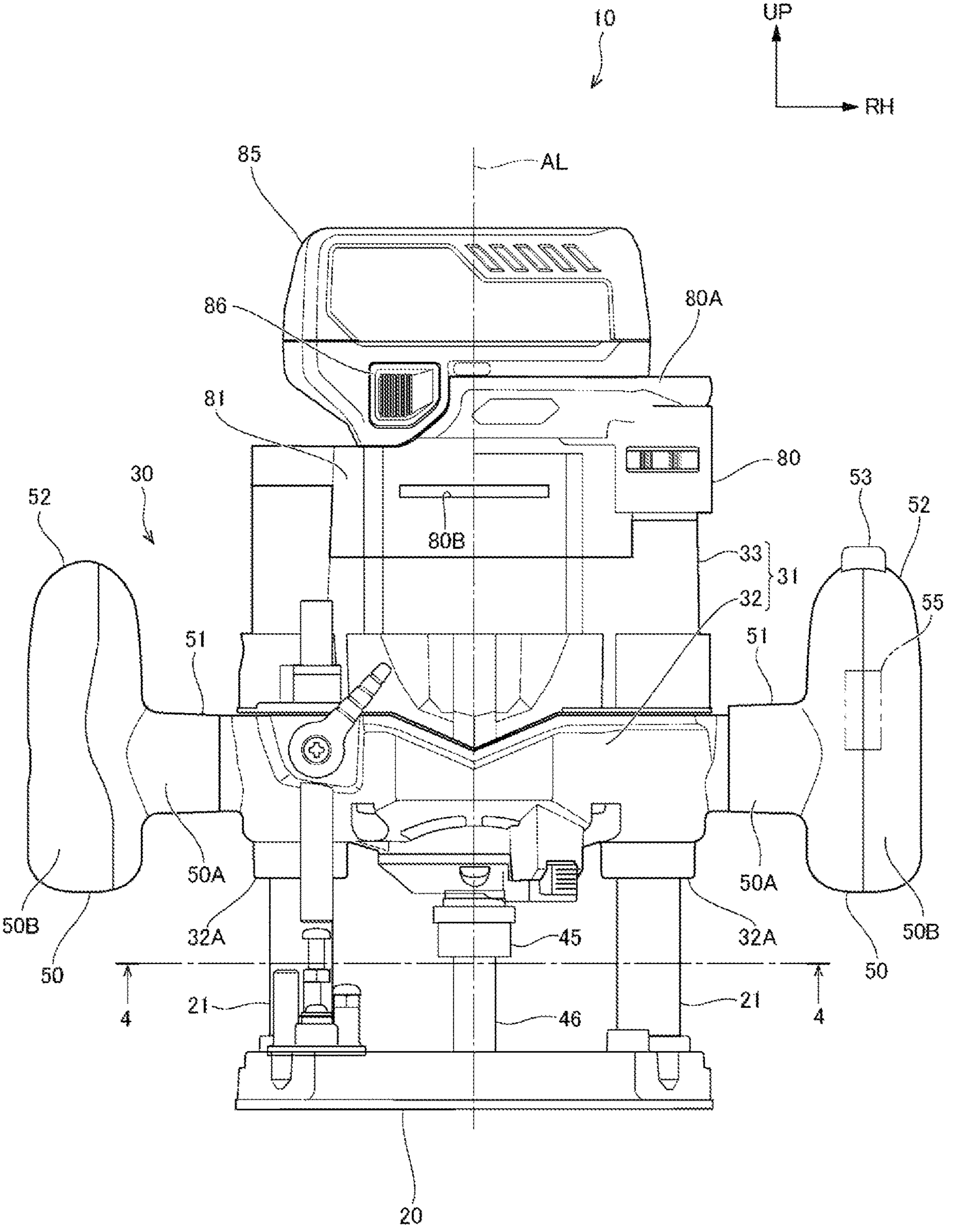
FIG. 1 is a front view showing the router according to the present embodiment as viewed from the front side.
Figure 2:
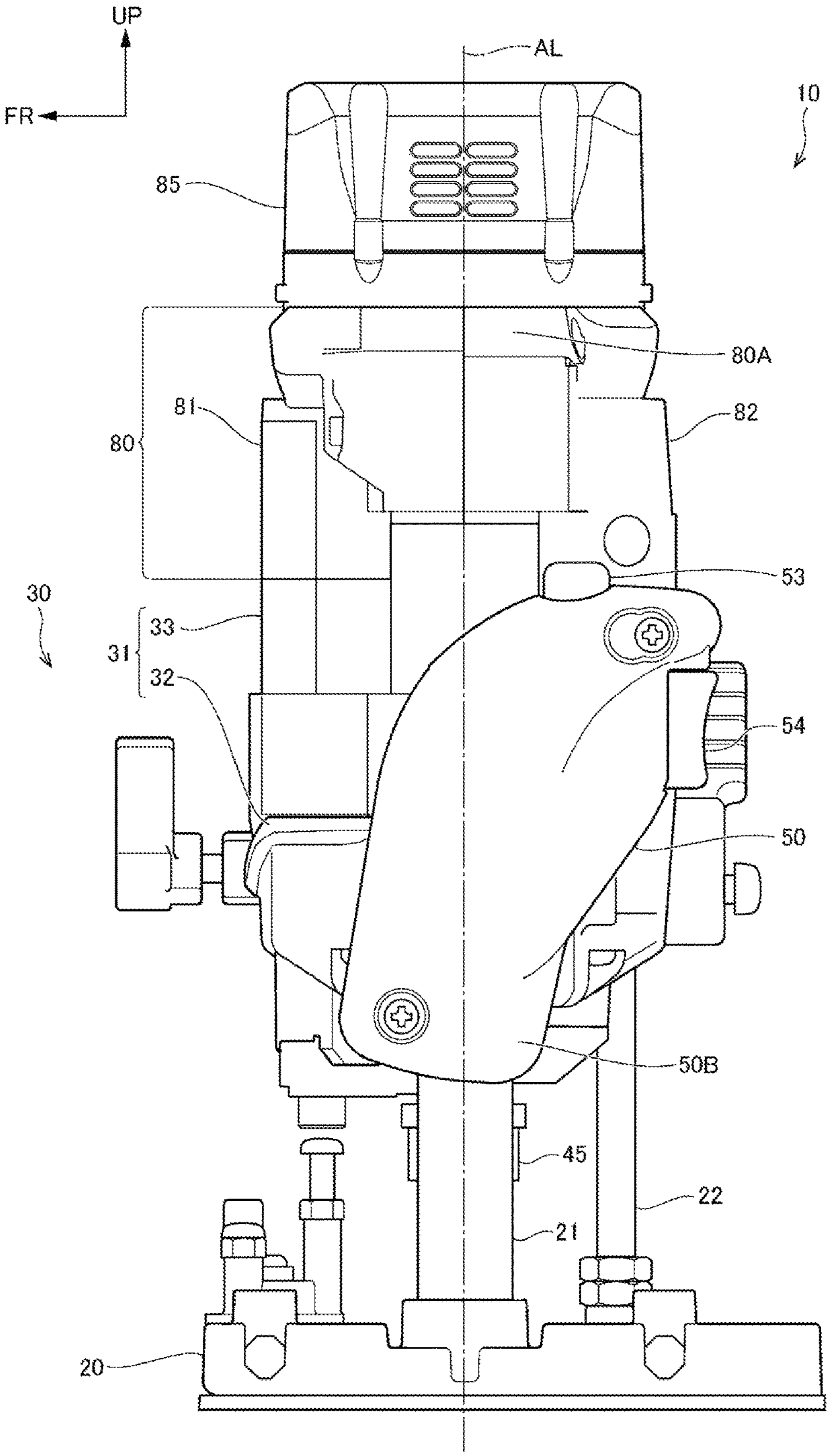
FIG. 2 is a side view of the router shown in FIG. 1 as viewed from the right side.

The router 10 is configured as a tool that is placed on the upper side of a material to be cut for cutting the material to be cut. As shown in FIG. 1 and FIG. 2, the router 10 includes a base 20, a router main body 30, a pair of illumination parts 70L and 70R (see FIG. 8), a battery holder 80 as a "split housing," a battery 85 as a "cell," and a controller 90 (see FIG. 5). Hereinafter, each configuration of the router 10 will be described.

(Regarding the base 20) As shown in FIG. 1 to FIG. 3, the base 20 constitutes the lower end of the router 10 and is formed in a substantially circular plate shape with the up-down direction as the plate thickness direction. An insertion portion 20A is formed through the substantially central portion of the base 20 in the up-down direction.

A pair of columns 21 are provided at both ends of the base 20 in the left-right direction, and the column 21 is formed in a substantially cylindrical shape with the up-down direction as the axial direction. The lower end of the column 21 is fixed to the base 20, and the column 21 extends upward from the base 20.

The base 20 is provided with a bolt 22 extending in the up-down direction on the rear side of the column 21 on the left side. The lower end of the bolt 22 is fixed to the base 20, and the bolt 22 extends upward from the base 20. Further, a nut 23 (see FIG. 3) is screwed to the upper end of the bolt 22.

(Regarding the router main body 30) As shown in FIG. 1 to FIG. 8, the router main body 30 includes a housing 31 that constitutes the outer shell of the router main body 30, a motor 40 accommodated inside the housing 31, a holding ring 60 as a "holding member," and a pair of left and right handles 50 attached to the housing 31. Further, the housing 31 includes an end bracket 32 as a "second housing" constituting the lower portion of the housing 31, and a motor housing 33 as a "first housing" constituting the upper portion of the housing 31. Hereinafter, each configuration of the router main body 30 will be described.

<Regarding the end bracket 32> The end bracket 32 is made of a metal material. The end bracket 32 is formed in a substantially rectangular parallelepiped box shape that is opened upward with the left-right direction as the longitudinal direction. The end bracket 32 has a single piece structure and cannot be split. A pair of connecting cylinder portions 32A are formed at both end side portions of the end bracket 32 in the left-right direction. The connecting cylinder portion 32A is formed in a substantially cylindrical shape with the up-down direction as the axial direction, and protrudes upward and downward from the bottom wall of the end bracket 32. Then, the column 21 described above is inserted into the connecting cylinder portion 32A so as to be relatively movable in the up-down direction.

In the central portion of the end bracket 32 in the left-right direction, a fan accommodation portion 32B for accommodating a fan 47, which will be described later, is formed between the pair of connecting cylinder portions 32A. The fan accommodation portion 32B is formed in a substantially cylindrical shape and protrudes upward from the bottom wall of the end bracket 32. Further, the end bracket 32 is formed with a substantially cylindrical support cylinder portion 32C on the radially inner side of the fan accommodation portion 32B. The support cylinder portion 32C is arranged coaxially with the fan accommodation portion 32B, and the inside of the support cylinder portion 32C penetrates in the up-down direction. A plurality of relief grooves 32D (see FIG. 5) opened downward are formed in the support cylinder portion 32C, and the relief grooves 32D are arranged side by side along the circumferential direction of the support cylinder portion 32C. Further, a bearing 34 for supporting the rotating shaft 41 of the motor 40, which will be described later, is provided on the radially inner side the support cylinder portion 32C.

In addition, on the bottom wall of the end bracket 32, a plurality of exhaust holes 32E (see FIG. 4) are formed between the fan accommodation portion 32B and the support cylinder portion 32C. The plurality of exhaust holes 32E are arranged side by side in the fan accommodation portion 32B along the circumferential direction. Further, on the radially outer side of the fan accommodation portion 32B, a pair of left and right circular illumination holes 32F (see FIG. 4) serving as “engaging portions” are formed through the bottom wall of the end bracket 32 in the up-down direction. One of the illumination holes 32F is arranged on the rear diagonally to the right with respect to the axis AL of the support cylinder portion 32C, the other one of the illumination holes 32F is arranged on the rear diagonally to the left with respect to the axis AL of the support cylinder portion 32C.

Furthermore, handle fixing portions 32G for fixing the handles 50, which will be described later, are formed at both ends of the end bracket 32 in the left-right direction. The handle fixing portion 32G is formed in a substantially columnar shape with the left-right direction as the axial direction, and protrudes outward from the end bracket 32 in the left-right direction. A cutout portion 32H (see the cross section AA of FIG. 4) is formed on the outer peripheral portion of the handle fixing portion 32G on the right side, and the cutout portion 32H is opened rearward and upward as viewed from the right side.

Further, a stopper portion 32J (see FIG. 4) protruding rearward is formed on the outer peripheral portion of the left end of the end bracket 32. The stopper portion 32J is formed in a substantially cylindrical shape with the up-down direction as the axial direction, and the bolt 22 described above is inserted into the stopper portion 32J. Then, the stopper portion 32J is in contact with the nut 23 provided at the upper end of the bolt 22 from below. As a result, the upward movement of the end bracket 32 (router main body 30) is restricted at the position shown in FIG. 1 and FIG. 2 (hereinafter, the position of the router main body 30 is referred to as an “initial position”).

<Regarding the motor housing 33> The motor housing 33 is made of a resin material, and is arranged adjacent to the upper side of the end bracket 32. The motor housing 33 is formed in a substantially rectangular box shape (cylindrical shape) that is opened downward. The motor housing 33 has a single piece structure and cannot be split in the front-rear direction or the left-right direction, for example. Further, the opening of the motor housing 33 is formed in a shape corresponding to the opening of the end bracket 32. Then, the motor housing 33 is fastened and fixed to the end bracket 32 so as to close the opening of the end bracket 32.

Figure 5:
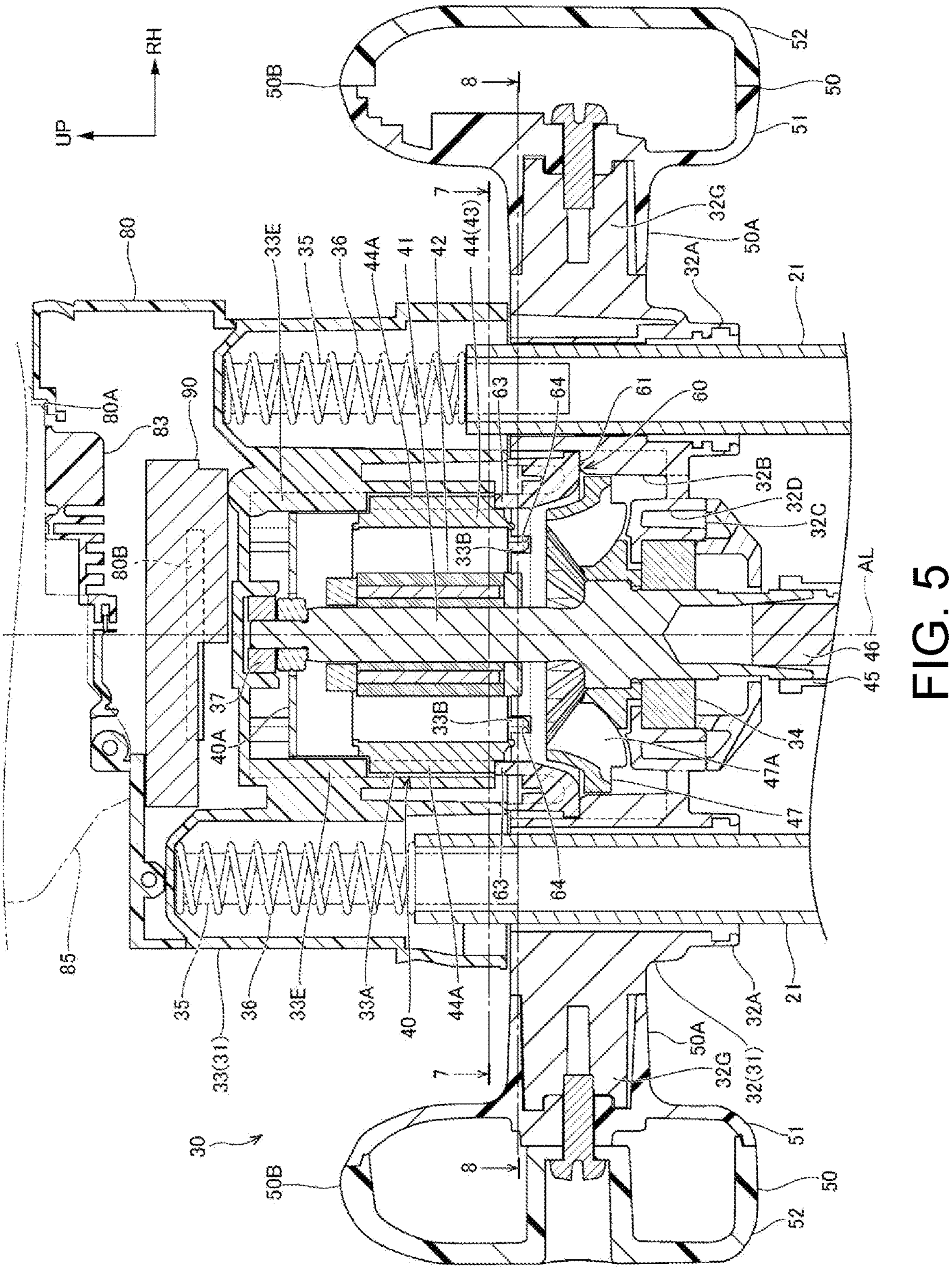
FIG. 5 is a cross-sectional view showing the inside of the router main body shown in FIG. 4 as viewed from the front side (cross-sectional view taken along the line 5-5 of FIG. 4).

As shown in FIG. 5, a pair of left and right connecting shafts 35 are provided inside the motor housing 33 at positions corresponding to the columns 21 described above. The connecting shaft 35 is formed in a substantially columnar shape with the up-down direction as the axial direction, and extends downward from the top wall of the motor housing 33 and is inserted into the column 21 so as to be relatively movable in the up-down direction. Further, an urging spring 36 configured as a compression coil spring is disposed around the connecting shaft 35. The upper end of the urging spring 36 is locked to the top wall of the motor housing 33, the lower end of the urging spring 36 is locked to the upper end of the column 21, and the motor housing 33 (that is, the router main body 30) is urged upward by the urging spring 36. As a result, the router main body 30 is held at the initial position. Then, the router main body 30 is configured to move relatively downward with respect to the base 20 by pushing the router main body 30 downward against the urging force of the urging spring 36.

Figure 7:
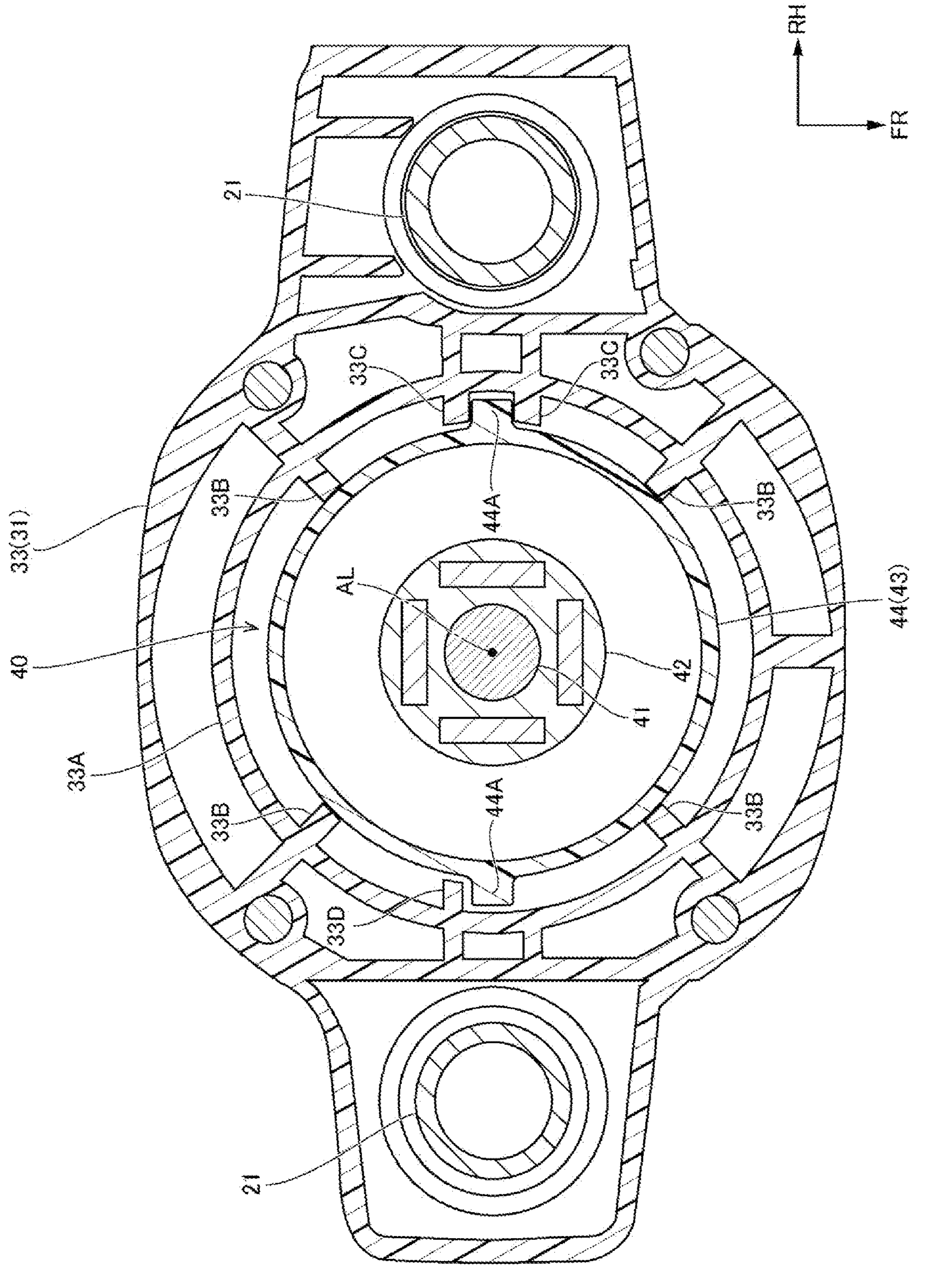
FIG. 7 is a plan cross-sectional view showing a state where the motor shown in FIG. 5 is accommodated in the motor accommodation portion at the position of the lower end of the motor as viewed from the upper side (cross-sectional view taken along the line 7-7 of FIG. 5).

As shown in FIG. 3, FIG. 5, and FIG. 7, a motor accommodation portion 33A for accommodating the motor 40, which will be described later, is formed in the central portion of the motor housing 33 in the left-right direction. The motor accommodation portion 33A is formed in a substantially bottomed cylindrical shape that is opened downward, and is arranged coaxially with the fan accommodation portion 32B and the support cylinder portion 32C of the end bracket 32. Four guide ribs 33B extending in the up-down direction are formed on the side wall of the motor accommodation portion 33A. The guide ribs 33B respectively protrude toward the radially inner side and the radially outer side from the side wall of the motor accommodation portion 33A, and the lower end of the guide rib 33B protrudes downward with respect to the side wall of the motor accommodation portion 33A. Furthermore, one guide rib 33B is arranged on the rear diagonally to the left with respect to the axis AL of the motor accommodation portion 33A, and the four guide ribs 33B are arranged every 90 degrees in the circumferential direction of the motor accommodation portion 33A.

A pair of front and rear right rotation restriction ribs 33C (see FIG. 7) extending in the up-down direction are formed at the right end of the inner peripheral surface of the motor accommodation portion 33A, and the pair of right rotation restriction ribs 33C are arranged at a predetermined interval in the front-rear direction. Further, a pair of left rotation restriction ribs 33D (see FIG. 7) extending in the up-down direction are formed at the left end of the inner peripheral surface of the motor accommodation portion 33A. In addition, a pair of left and right axial restriction ribs 33E (see FIG. 5) are formed on the inner peripheral surface of the motor accommodation portion 33A. The axial restriction rib 33E extends from the top wall of the motor accommodation portion 33A to the vertical intermediate portion of the motor accommodation portion 33A. Then, the right axial restriction rib 33E is arranged between the pair of right rotation restriction ribs 33C and is connected to the pair of right rotation restriction ribs 33C. Further, the left axial restriction rib 33E is arranged on the front side of the left rotation restriction rib 33D and is connected to the left rotation restriction rib 33D.

As shown in FIG. 3, four communication holes 33F are formed through the top wall of the motor accommodation portion 33A. The communication holes 33F are formed in a substantially fan shape in a plan view, and are arranged every 90 degrees in the circumferential direction of the motor accommodation portion 33A. Further, a communication groove 33G opened downward is formed at the right end of the lower end of the motor housing 33, and the inside and outside of the motor housing 33 are communicated with each other by the communication groove 33G.

<Regarding the motor 40> As shown in FIG. 3, FIG. 5, and FIG. 7, the motor 40 is accommodated in the motor accommodation portion 33A of the motor housing 33. The motor 40 includes the rotating shaft 41 that takes the up-down direction as the axial direction, a substantially cylindrical rotor 42 fixed to the rotating shaft 41, and a substantially cylindrical stator 43 arranged on the radially outer side of the rotor 42.

The rotating shaft 41 is arranged coaxially with the motor accommodation portion 33A, and the lower end (the end on one axial side) of the rotating shaft 41 protrudes downward from the motor housing 33 and passes through the support cylinder portion 32C of the end bracket 32. That is, the axis of the rotating shaft 41 coincides with the axis AL. Then, the lower end of the rotating shaft 41 is rotatably supported by the bearing 34 of the end bracket 32, and the upper end of the rotating shaft 41 is rotatably supported by a bearing 37 fixed to the motor housing 33. Since the bearing 34 and the bearing 37 are respectively held by the end bracket 32 and the motor housing 33, which are configured to be not splittable and thus have high rigidity, the rotating shaft 41 can be supported with high accuracy. Further, a tip tool 46 is attached to the lower end of the rotating shaft 41 via a collet chuck 45. As a result, the tip tool 46 is configured to pass through the insertion portion 20A of the base 20 by pushing the router main body 30 downward from the initial position.

The stator 43 has a stator holder 44, and the stator holder 44 is formed in a substantially cylindrical shape. A stator coil (not shown) is wound around the stator holder 44, and the stator coil is connected to a motor substrate 40A provided at the upper end of the motor 40. A pair of left and right positioning ribs 44A are formed on the outer peripheral portion of the stator holder 44, and the positioning ribs 44A extend in the up-down direction.

Then, in a state where the motor 40 is accommodated in the motor accommodation portion 33A, the guide ribs 33B of the motor housing 33 are arranged adjacent to the radially outer side of the stator holder 44 (see FIG. 7). As a result, the stator holder 44 (stator 43) is arranged coaxially with the rotating shaft 41. Further, the right positioning rib 44A is inserted between the pair of right rotation restriction ribs 33C in the motor housing 33, and the left positioning rib 44A is arranged adjacent to the front side of the left rotation restriction rib 33D of the motor housing 33 (see FIG. 7). As a result, the relative rotation of the stator 43 with respect to the motor housing 33 is restricted by the right rotation restriction rib 33C and the left rotation restriction rib 33D, and the positioning ribs 44A. In addition, the positioning rib 44A is arranged adjacent to the lower side of the axial restriction rib 33E of the motor housing 33, and is arranged adjacent to the upper side of the holding ring 60 described later (see FIG. 5). As a result, the vertical movement of the stator 43 is restricted by the axial restriction rib 33E and the holding ring 60.

As shown in FIG. 3, FIG. 5, FIG. 6, and FIG. 8, the fan 47 is provided at the lower end of the rotating shaft 41 to be integrally rotatable on the lower side of the rotor 42 and the stator 43. Specifically, the fan 47 is arranged on the upper side of the support cylinder portion 32C of the end bracket 32 and on the radially inner side of the upper portion of the fan accommodation portion 32B. Further, the upper portion of the fan 47 protrudes upward from the fan accommodation portion 32B. The fan 47 has a plurality of blades 47A. The blades 47A extend in the radial direction of the rotating shaft 41 and are arranged side by side in the rotation direction of the fan 47. Besides, in the present embodiment, the fan 47 is configured as a so-called axial fan, and when the fan 47 rotates, the air (cooling air) flowing in from the intake hole 80B, which will be described later, cools the controller 90 and then flows into the motor housing 33 from the upper opening of the motor housing 33 to cool the motor 40, and the air is rectified to the lower side of the fan 47 and flows out from the exhaust holes 32E to the lower side.

<Regarding the handle 50> As shown in FIG. 1, FIG. 2, and FIG. 5, the handle 50 is formed hollow in a substantially T shape rotated by 90 degrees in the front view. Specifically, the handle 50 includes a substantially cylindrical mounting portion 50A that takes the left-right direction as the axial direction, and a grip portion 50B extending in the up-down direction from the outer side end of the mounting portion 50A in the left-right direction. Further, the handle 50 is split into two in the left-right direction at the portion of the grip portion 50B, and is composed of two members. Specifically, the handle 50 includes a handle main body 51 that constitutes the inner portion of the handle 50 in the left-right direction, and a handle cover 52 that constitutes the outer portion of the handle 50 in the left-right direction. Then, the handle fixing portion 32G of the end bracket 32 is inserted into the mounting portion 50A, and the handle main body 51 is fastened and fixed to the end bracket 32. Furthermore, after the handle main body 51 is fixed to the end bracket 32, the handle cover 52 is fastened and fixed to the handle main body 51 by screws.

On the right handle 50, a switch button 53 is provided on the upper portion so as to be pressed, and a trigger 54 is provided on the rear portion so as to be pulled. Further, inside the right handle 50, a switch circuit 55 is provided to be operated by operating the switch button 53 and the trigger 54, and the switch circuit 55 is fixed to the handle main body 51. The switch circuit 55 has a switch (not shown) to be operated by the switch button 53 and the trigger 54. The switch is electrically connected to the controller 90, which will be described later, and is configured to output an output signal corresponding to the operation states of the switch button 53 and the trigger 54 to the controller 90 described later.

<Regarding the holding ring 60> As shown in FIG. 5, FIG. 6, and FIG. 8 to FIG. 11, the holding ring 60 is made of a transparent resin material that has translucency. The holding ring 60 has a ring base 61 as a "base portion." The ring base 61 is formed in a substantially ring shape (substantially cylindrical shape) with the up-down direction as the axial direction as a whole, and is formed in a substantially U shape that is opened upward in a cross-sectional view as viewed from the circumferential direction. Specifically, the ring base 61 includes a substantially cylindrical inner cylinder 61A that takes the up-down direction as the axial direction, a cylindrical outer cylinder 61B that is arranged on the radially outer side of the inner cylinder 61A, and a bottom portion 61C that connects the lower end of the inner cylinder 61A and the lower end of the outer cylinder 61B. As a result, a guide groove 62 serving as a "groove" opened upward is formed inside the ring base 61.

Then, the ring base 61 is arranged inside the end bracket 32 on the radially outer side of the fan 47. Specifically, the bottom portion 61C of the ring base 61 is arranged adjacent to the upper side of the fan accommodation portion 32B of the end bracket 32, and the outer cylinder 61B of the ring base 61 is arranged adjacent to the lower side of a part of the lower end of the motor housing 33. As a result, the ring base 61 is sandwiched in the up-down direction by the end bracket 32 and the motor housing 33, and is fixed to both of them. Further, in a state where the ring base 61 is fixed, the upper portion of the blade 47A of the fan 47 is arranged on the radially inner side of the lower portion of the inner cylinder 61A of the ring base 61. As a result, the air in the motor housing 33 is guided by the inner cylinder 61A of the holding ring 60 and flows to the side of the fan 47 (blade 47A).

A pair of left and right restriction portions 63 protruding upward are formed on the upper end surface of the inner cylinder 61A. The restriction portions 63 are arranged at positions corresponding to the positioning ribs 44A of the stator 43, and the lower ends of the positioning ribs 44A are in contact with the upper ends of the restriction portions 63 (see FIG. 5). As a result, the downward movement of the stator 43 is restricted by the holding ring 60.

Further, four guide recesses 64 are formed at the upper end of the inner cylinder 61A. The guide recess 64 is formed in a concave shape that is opened upward, and the guide recesses 64 are arranged at positions corresponding to the guide ribs 33B of the motor housing 33. Then, the lower end of the guide rib 33B is inserted into the guide recess 64 (see FIG. 5, FIG. 6, and FIG. 8). As a result, the motor housing 33 is guided by the holding ring 60 when the motor housing 33 is attached to the end bracket 32. Further, in a state where the guide rib 33B is inserted into the guide recess 64, the lower end of the guide rib 33B extends in the radial direction of the ring base 61 in the upper portion of the guide groove 62 of the holding ring 60 (see FIG. 8).

In addition, the holding ring 60 has a pair of left and right holding pillars 65 as "extension portions" for holding the illumination parts 70L and 70R, which will be described later. The holding pillar 65 is formed in a substantially rectangular columnar shape extending in the up-down direction. Further, the holding pillar 65 is arranged at a position corresponding to the illumination hole 32F of the end bracket 32 described above (see FIG. 8), and is arranged adjacent to the radially outer side of the ring base 61. Specifically, one of the holding pillars 65 is arranged on the rear diagonally to the right with respect to the axis AL of the rotating shaft 41 in a plan view, and the other one of the holding pillars 65 is arranged on the rear diagonally to the left with respect to the axis AL of the rotating shaft 41 in a plan view. Then, the upper end of the holding pillar 65 is connected to the lower end of the outer cylinder 61B of the ring base 61, and the holding pillar 65 is integrally formed with the ring base 61. That is, the holding pillar 65 extends downward from the ring base 61. Specifically, the lower end of the holding pillar 65 is arranged below the fan 47. In other words, the holding pillar 65 extends in the up-down direction on the radially outer side of the fan 47.

The holding pillar 65 is inclined at approximately 45 degrees in a plan view, and the rear surface 65A of the holding pillar 65 is inclined to the rear side toward the right side in a plan view. The illumination accommodation portions 66 (see (B) and (D) of FIG. 11) for accommodating the illumination parts 70L and 70R, which will be described later, are formed at the lower ends of the rear surfaces 65A of the holding pillars 65 (specifically, the portions below the fan 47), and the illumination accommodation portion 66 is formed in a concave shape that is opened rearward (specifically, in a direction orthogonal to the rear surface 65A). Further, a pair of wiring grooves 67 (see (B) and (C) of FIG. 11) that are opened rearward are formed on the rear surface 65A of the holding pillar 65. The wiring grooves 67 extend in the up-down direction and are arranged side by side in the width direction of the holding pillars 65. The upper end of the wiring groove 67 is opened upward, and the lower end of the wiring groove 67 communicates with the illumination accommodation portion 66.

A lens portion 65B (an element grasped as an "engaged portion" in a broad sense) is formed at the lower end of the holding pillar 65. The lens portion 65B is formed in a substantially columnar shape with the up-down direction as the axial direction, and protrudes downward from the holding pillar 65. The lens portion 65B is fitted into the illumination hole 32F of the end bracket 32. As a result, the lens portion 65B and the illumination hole 32F are engaged with each other around the axis AL, and the position of the holding ring 60 with respect to the end bracket 32 is determined. Specifically, the ring base 61 is arranged coaxially with the rotating shaft 41.

A pair of wiring slits 68L and 68R are formed in the outer cylinder 61B of the ring base 61 at positions corresponding to the pair of left and right holding pillars 65. The pair of wiring slits 68L and 68R are formed through the outer cylinder 61B in the radial direction, and are opened upward. As a result, the inside and outside of the ring base 61 are communicated with each other by the wiring slits 68L and 68R.

In addition, four reinforcing ribs 69 are formed inside the guide groove 62 of the ring base 61. The reinforcing rib 69 is formed in a plate shape with the circumferential direction of the ring base 61 as the plate thickness direction, and is connected to the inner cylinder 61A, the bottom portion 61C, and the outer cylinder 61B. One reinforcing rib 69 is arranged at the rear end of the ring base 61, and four reinforcing ribs 69 are arranged every 90 degrees in the circumferential direction of the ring base 61. A wiring slit 69A is formed in the reinforcing rib 69. The wiring slit 69A is formed through the reinforcing rib 69 in the plate thickness direction, and is opened upward.

(Regarding the illumination parts 70L and 70R) As shown in FIG. 8, FIG. 10, and FIG. 11, the illumination parts 70L and 70R each have an illumination substrate 71 and an LED 72 as a "light source."

The illumination substrate 71 is formed in a substantially rectangular plate shape with the up-down direction as the plate thickness direction, and is accommodated in the illumination accommodation portion 66 of the holding ring 60. The LED 72 is mounted on the lower surface of the illumination substrate 71, and is accommodated in the illumination accommodation portion 66 together with the illumination substrate 71. As a result, the LED 72 (illumination part 70L, 70R) is arranged below the fan 47. Then, the LED 72 is configured to irradiate the emitted light downward. Specifically, the light emitted by the LED 72 passes through the lens portion 65B of the holding ring 60 and irradiates the lower side of the end bracket 32 from the illumination hole 32F of the end bracket 32. As a result, the light illuminates the periphery of the tip tool 46. More specifically, the light emitted by the LED 72 is configured to illuminate the periphery of the tip tool 46 on the rear side of the tip tool 46 and on the outer side in the left-right direction.

Furthermore, in the left illumination part 70L, two lead wires 73 serving as "wiring" extend from the illumination substrate 71, and the lead wires 73 are arranged in the wiring groove 67 of the holding pillar 65 on the left side of the holding ring 60. Further, the lead wire 73 is inserted into the guide groove 62 of the ring base 61 from the wiring slit 68L on the left side of the holding ring 60, and is arranged in the rear portion of the guide groove 62 and extends from the right wiring slit 68R to the outside of the guide groove 62. Specifically, the lead wire 73 passes through the wiring slit 69A of the reinforcing rib 69 on the rear side and extends from the right wiring slit 68R to the outside of the guide groove 62. In addition, in a state where the lead wire 73 is arranged in the guide groove 62, the lower end of the guide rib 33B of the motor housing 33 is arranged on the upper side of the lead wire 73, and the upward movement of the lead wire 73 is restricted by the guide rib 33B (see FIG. 8).

Then, one of the two lead wires 73 is arranged in one of the wiring grooves 67 of the right holding pillar 65, and is connected to the illumination substrate 71 of the right illumination part 70R. Further, a lead wire 74 serving as "wiring" extends from the illumination substrate 71 of the right illumination part 70R, and the lead wire 74 is arranged in the other one of the wiring grooves 67 in the right holding pillar 65.

Then, the other one of the lead wires 73 and the lead wire 74 pass through the mounting portion 50A of the right handle 50 and are connected to the switch circuit 55. Specifically, the lead wire 73 and the lead wire 74 pass through the communication groove 33G of the motor housing 33 and the cutout portion 32H of the handle fixing portion 32G in the end bracket 32 and are connected to the switch circuit 55.

(Regarding the battery holder 80) As shown in FIG. 1 to FIG. 3, the battery holder 80 is provided on the upper side of the motor housing 33, and is formed in a substantially box shape that is opened downward. The battery holder 80 is split into two in the front-rear direction. That is, the battery holder 80 includes a front holder 81 that constitutes the front portion of the battery holder 80, and a rear holder 82. The front holder 81 and the rear holder 82 are fastened and fixed to the motor housing 33.

The battery holder 80 is formed with a battery mounting portion 80A for mounting the battery 85 described later, and the battery mounting portion 80A is formed in a concave shape that is opened upward and leftward. Further, the intake hole 80B that functions as an inlet for the air flow generated by the rotation of the fan 47 is formed near the vertical center of the battery holder 80. In detail, the intake hole 80B is formed on the front side wall of the front holder 81 and the rear side wall of the rear holder 82. In addition, the battery holder 80 is provided with a connector 83 (see FIG. 3), and the upper portion of the connector 83 is exposed inside the battery mounting portion 80A so as to be connected to the battery 85 described later.

(Regarding the battery 85) The battery 85 is formed in a substantially rectangular parallelepiped shape. Then, the battery 85 is attached to the battery mounting portion 80A of the battery holder 80 from the left side. The battery 85 has a connector (not shown), and in a state where the battery 85 is attached to the battery mounting portion 80A, the connector is connected to the connector 83, and electric power is supplied to the controller 90 described later. Furthermore, the battery 85 has a pair of lock members 86, and the lock members 86 are provided on the front and rear side portions of the battery 85. Then, in a state where the battery 85 is attached to the battery mounting portion 80A, the lock members 86 engage with the battery holder 80 to maintain the attached state of the battery 85.

(Regarding the controller 90) As shown in FIG. 3, the controller 90 is accommodated inside the battery holder 80 and is fixed to the battery holder 80. The controller 90 has a control board (not shown), and the motor 40 and the connector 83 described above are electrically connected to the control board. Specifically, a lead wire (not shown) extending from the motor substrate 40A passes through the communication hole 33F of the motor housing 33 and is connected to the control board. Further, a lead wire (not shown) extending from the control board is connected to the switch circuit 55, and the controller 90 and the switch circuit 55 are electrically connected. Specifically, the lead wire is arranged in the motor housing 33 on the radially outer side of the motor accommodation portion 33A, and passes through the communication groove 33G of the motor housing 33 and the cutout portion 32H of the handle fixing portion 32G in the end bracket 32 to be connected to the switch circuit 55. As a result, the controller 90 and the illumination parts 70L and 70R are electrically connected. Then, the controller 90 is configured to turn on or off the LED 72 according to the on/off operation of the switch button 53. The controller 90 is also configured to control the operation for the motor 40 when the trigger 54 is operated with the switch button 53 on.

(Function/effect) Next, the function/effect of the router 10 of the present embodiment will be described.

The router 10 configured as described above includes the illumination parts 70L and 70R that have the LEDs 72. The illumination parts 70L and 70R are accommodated in the illumination accommodation portions 66 of the holding ring 60 and are held by the holding ring 60. Then, the operator grips the grip portion 50B of the handle 50 and turns on the switch button 53, so that the electric power of the battery 85 is supplied to the LED 72 by the controller 90 for the LED 72 to emit light. The light emitted by the LED 72 passes through the lens portion 65B of the holding ring 60 and goes downward from the illumination hole 32F of the end bracket 32 to illuminate the periphery of the tip tool 46. Specifically, the portion on the outer side in the left-right direction and the rear side of the tip tool 46 is illuminated.

Then, when the operator pulls the trigger 54 in this state, the rotating shaft 41 of the motor 40 rotates together with the tip tool 46 under the control of the controller 90. Further, when the operator pushes the handle 50 downward in this state, the router main body 30 moves relatively downward with respect to the base 20. As a result, the tip tool 46 comes into contact with the material to be cut and cuts the material to be cut. Further, the operator cuts the material to be cut while moving the router 10 rearward. As a result, the portion of the router 10 on the moving direction side with respect to the tip tool 46 is illuminated by the LED 72. As a result, it is possible to improve the visibility around the tip tool 46 during cutting. Accordingly, the workability for the operator can be improved.

Here, the holding ring 60 for holding the illumination parts 70L and 70R is provided on the lower side of the stator 43 of the motor 40. The restriction portion 63 of the holding ring 60 is arranged adjacent to the lower side of the positioning rib 44A of the stator 43 to restrict the downward movement of the stator 43. That is, the holding ring 60 has two functions, i.e., a function of holding the illumination parts 70L and 70R and a function of restricting the downward movement of the stator 43. In other words, the illumination parts 70L and 70R can be held by utilizing the holding ring 60 that restricts the downward movement of the stator 43. Therefore, the illumination parts 70L and 70R can be mounted on the router 10 by using the member for holding the illumination parts 70L and 70R and the member for restricting the downward movement of the stator 43 as a common member. According to the above, it is possible to illuminate the periphery of the tip tool 46 with the illumination parts 70L and 70R while preventing an increase in the number of components.

Furthermore, the upper portion of the fan 47 is arranged on the radially inner side of the lower portion of the ring base 61 in the holding ring 60. As a result, the air on the upper side of the fan 47 can be guided by the inner cylinder 61A of the ring base 61 and guided to the side of the blades 47A of the fan 47. Accordingly, the air in the motor housing 33 can be efficiently guided to the fan 47 by utilizing the holding ring 60 that restricts the downward movement of the stator 43.

Besides, in the holding ring 60, the bottom portion 61C of the ring base 61 is arranged adjacent to the upper side of the fan accommodation portion 32B of the end bracket 32, and the outer cylinder 61B of the ring base 61 is arranged adjacent to the lower side of a part of the lower end of the motor housing 33. As a result, the ring base 61 is sandwiched in the up-down direction by the end bracket 32 and the motor housing 33, and is fixed to both of them. Therefore, no additional component is required for fixing, and the holding ring 60 can be fixed to the end bracket 32 and the motor housing 33 with a simple configuration while maintaining the single piece structure of the end bracket 32 and the motor housing 33.

Further, a pair of lens portions 65B are formed in the holding ring 60, and the pair of lens portions 65B are fitted into the illumination holes 32F of the end bracket 32. As a result, the holding ring 60 and the end bracket 32 can be engaged with each other around the axis AL of the rotating shaft 41 to determine the position of the holding ring 60 with respect to the end bracket 32. In other words, it is possible to determine the position of the holding ring 60 with respect to the end bracket 32 while restricting the rotation of the rotating shaft 41 around the axis AL in the holding ring 60. As a result, the motor housing 33 can be assembled to the end bracket 32 while the holding ring 60 is temporarily fixed to the end bracket 32, and the holding ring 60 can be fixed by the end bracket 32 and the motor housing 33. Accordingly, the assemblability of the motor housing 33 to the end bracket 32 can be improved.

Furthermore, the holding ring 60 includes the ring base 61 that is arranged between the motor 40 (rotor 42 and stator 43) and the fan 47, and the holding pillars 65 that extend downward from the ring base 61. Then, the illumination parts 70L and 70R are accommodated in the illumination accommodation portions 66 formed at the lower ends of the holding pillars 65. As a result, while the downward movement of the stator 43 is restricted by the ring base 61, the holding pillars 65 can hold the LEDs 72 of the illumination parts 70L and 70R at positions close to the tip tool 46. Accordingly, the illumination effect of the illumination parts 70L and 70R for the periphery of the tip tool 46 can be enhanced. In particular, the arrangement of the illumination substrate 71 and the LED 72 in the bottom portion of the end bracket 32 that has a box-shaped (cylindrical) single piece structure makes it difficult to assemble, but by forming the holding pillars 65 extending downward and arranging the holding ring 60, two illumination arrangements can be easily made.

Besides, the illumination parts 70L and 70R (illumination accommodation portions 66) are arranged below the fan 47, and the wiring groove 67 extending in the up-down direction is formed in the holding pillar 65 of the holding ring 60. Then, the lead wires 73 and 74 extending from the illumination parts 70L and 70R are arranged in the wiring grooves 67. That is, on the radially outer side of the fan 47, the holding pillars 65 extend in the up-down direction, and the lead wires 73 and 74 are held by the holding pillars 65. As a result, it is possible to arrange the illumination parts 70L and 70R at positions close to the tip tool 46 while preventing the lead wires 73 and 74 extending from the illumination parts 70L and 70R from moving to the side of the fan 47.

Further, the ring base 61 of the holding ring 60 is formed in a ring shape, and the ring base 61 has the guide groove 62 that extends over the entire circumference in the circumferential direction. Then, the lead wire 73 extending from the illumination part 70L is arranged in the guide groove 62. As a result, it is possible to arrange the lead wire 73 around the fan 47 while the ring base 61 (guide groove 62) prevents the lead wire 73 for supplying electric power to the illumination part 70L from moving to the side of the fan 47.

In addition, the holding ring 60 is provided with a pair of illumination parts 70L and 70R, and the illumination parts 70L and 70R are connected by the lead wire 73 arranged in the guide groove 62. Therefore, it is possible to connect the pair of illumination parts 70L and 70R arranged around the fan 47 with the lead wire 73 while the ring base 61 (guide groove 62) prevents the lead wire 73 from moving to the side of the fan 47. In other words, the lead wire 73 can be prevented from being displaced from a desired position during assembly or driving.

Furthermore, the ring base 61 of the holding ring 60 is formed with the reinforcing ribs 69 inside the guide groove 62, and the reinforcing ribs 69 are connected to the inner cylinder 61A, the outer cylinder 61B, and the bottom portion 61C of the ring base 61. Further, the reinforcing rib 69 is formed with the wiring slit 69A that penetrates in the circumferential direction of the guide groove 62, and the lead wire 73 arranged in the guide groove 62 is inserted into the wiring slit 69A. As a result, the lead wire 73 in the guide groove 62 can be held while the ring base 61 is reinforced by the reinforcing rib 69.

Moreover, the guide recesses 64 are formed in the inner cylinder 61A of the holding ring 60. Then, the guide rib 33B of the motor housing 33 is inserted into the guide recess 64 and is arranged in the upper portion of the guide groove 62 of the ring base 61. Therefore, the guide rib 33B of the motor housing 33 can restrict the upward movement of the lead wire 73 arranged in the guide groove 62. As a result, the guide rib 33B for determining the position of the stator 43 with respect to the motor housing 33 can be utilized to prevent the lead wire 73 from coming out of the opening of the guide groove 62. Accordingly, it is possible to maintain a better arrangement state of the lead wire 73 in the guide groove 62.

In the present embodiment, the fan 47 is configured as a so-called axial fan, but the fan 47 may be configured as a so-called centrifugal fan. In this case, the air flow generated by the fan 47 may be rectified in the holding ring 60. Hereinafter, the configuration in which the fan 47 is a centrifugal fan will be described with reference to (A) and (B) of FIG. 12.

As shown in these figures, when the fan 47 is configured as a centrifugal fan, the blades 47A of the fan 47 are arranged on the radially inner side of the lower end of the inner cylinder 61A in the holding ring 60. Further, a guide inclined portion 60A is formed at the lower end of the inner cylinder 61A, and the guide inclined portion 60A is inclined downward as it goes toward the radially outer side of the ring base 61 in a cross-sectional view as viewed from the circumferential direction of the ring base 61. Furthermore, the bottom portion 61C of the ring base 61 is formed with a guide piece 60B on the radially outer side of the ring base 61 with respect to the guide inclined portion 60A, and the guide piece 60B is formed in a substantially cylindrical shape that extends downward from the bottom portion 61C.

Since the fan 47 is configured as a centrifugal fan, the fan 47 generates an air flow AC that flows from the center side of the fan 47 to the radially outer side. At this time, since the opening on the upper side (downstream side of the air flow AC) of the holding ring 60 has a diameter smaller than the outer diameter of the fan 47 (blades 47A), air can be efficiently collected on the side of the rotating shaft 41, and the flow of the air flow AC flowing from the center side to the radially outer side can be smoothly guided. Further, the air flow AC flowing to the radially outer side of the fan 47 is rectified by the guide inclined portion 60A, and the direction of the air flow AC is changed downward. Besides, the air flow AC changed to flow downward by the guide inclined portion 60A is guided by the guide piece 60B and flows downward from the holding ring 60. Then, the air flow AC flowing downward from the holding ring 60 is discharged downward from the exhaust holes 32E of the end bracket 32. As described above, the air flow AC generated by the fan 47 can be rectified by the holding ring 60 and discharged from the exhaust holes 32E of the end bracket 32. Accordingly, the holding ring 60 that holds the illumination parts 70L and 70R and restricts the downward movement of the stator 43 can be utilized to rectify the air flow AC generated by the fan 47. Since it is not necessary to separately provide a member for rectifying the air flow AC, it is possible to more effectively prevent an increase in the number of components.

Furthermore, when the fan 47 is configured as a centrifugal fan and the air flow AC generated by the fan 47 is rectified by the holding ring 60, the restriction portion 63 in the holding ring 60 may be omitted, and the downward movement of the stator 43 may be restricted by another member. For example, the downward movement of the stator 43 may be restricted by the end bracket 32.

Additionally, in the present embodiment, the illumination accommodation portion 66 is formed at the lower end of the holding pillar 65 in the holding ring 60, but the vertical position of the illumination accommodation portion 66 can be arbitrarily changed. That is, the positions of the illumination parts 70L and 70R in the up-down direction can be arbitrarily changed.

For example, as shown in FIG. 13, the illumination part 70R (illumination part 70L) may be configured to be held at the upper end of the holding pillar 65. In this case, the illumination accommodation portion 66 is formed at the upper end of the holding pillar 65, and is formed in a concave shape that is opened upward. Further, the wiring groove 67 in the holding pillar 65 is omitted. Then, the illumination part 70R (illumination part 70L) is accommodated in the illumination accommodation portion 66 from above to be held by the holding pillar 65. Besides, in this case, the light emitted by the LED 72 of the illumination part 70R (illumination part 70L) (see the arrows indicated by the two-dot chain lines in FIG. 13) passes through the portion of the holding pillar 65 below the illumination accommodation portion 66 and irradiates the periphery of the tip tool 46. That is, the holding pillar 65 including the lens portion 65B functions as a light guide portion that guides the light emitted by the LED 72 downward, and can guide the light to the lower side of the fan 47. Then, the light can be irradiated downward from the illumination hole 32F of the end bracket 32 to illuminate the periphery of the tip tool 46. Further, in this case, it is not necessary to arrange the lead wires 73 and 74 in the wiring groove 67 of the holding pillar 65. Accordingly, it is possible to reduce the assembly man-hours when assembling the illumination parts 70L and 70R to the holding ring 60. Furthermore, it is possible to omit the wiring area of the lead wire 73 extending downward from the initial position (position of the wiring slit 68R) at which the lead wire 73 is attached to the holding ring 60. Therefore, it is possible to achieve the same effect as the guide groove 62, which is to prevent fluttering, that is, displacement, of the lead wire 73 in this area.

Further, in the present embodiment, a pair of illumination parts 70L and 70R are held by the holding ring 60, but the number of illumination members held by the holding ring 60 may be arbitrarily set. That is, the number of illumination members held by the holding ring 60 may be one or three or more. Besides, although a router has been described as an embodiment of the invention, the invention can be applied to various other work machines. In particular, the invention is applicable to a work machine in which the fan is located between the tip tool and the motor, and is also applicable to a work machine such as a disc grinder or a jigsaw.

What is claimed is:

1. A work machine, comprising:

a motor comprising a rotating shaft extending along an up-down direction, a rotor configured to be integrally rotatable on the rotating shaft, and a stator arranged on a radially outer side of the rotor;

a fan provided on the rotating shaft and arranged below the stator;

a motor housing accommodating the motor;

a tip tool attached to a lower end of the rotating shaft;

a pair of columns, extending along the up-down direction;

an end bracket, configured separately from the motor housing the end bracket holding a bearing for supporting the rotating shaft of the motor and accommodating at least a part of the pair of columns;

a right handle and a left handle, fixed to a right side and a left side of the end bracket respectively;

a switch circuit unit, configured to be operated by an operator to drive the motor the switch circuit unit disposed on one of the right handle or the left handle;

a base, fixed to the pair of columns;

an illumination part comprising a light source that irradiates emitted light toward a periphery of the tip tool; and a holding portion extending from a high position above the fan to a low position below the fan and holding the illumination part, wherein the illumination part is positioned offset from a line that connects axes of the pair of columns when viewed along the up-down direction.

2. The work machine according to claim 1, wherein the end bracket is provided on a lower side of the motor housing, and wherein the holding portion is sandwiched by the motor housing and the end bracket in the up-down direction.

3. The work machine according to claim 1, wherein an engaging portion engaged with the holding portion is formed in the end bracket, and rotation of the holding portion in a circumferential direction of the rotating shaft is restricted by the engaging portion.

4. The work machine according to claim 1, wherein the illumination part is held at a lower end of the holding portion.

5. The work machine according to claim 1, wherein the illumination part is held at an upper end portion of the holding portion, the holding portion transmits light emitted by the light source, and the light is emitted from a lower end of the holding portion toward the periphery of the tip tool.

6. The work machine according to claim 1, wherein a groove that is opened upward is formed in the holding portion, and a wiring for supplying electric power to the illumination part is connected to the illumination part and arranged in the groove.

7. The work machine according to claim 1, wherein the holding portion holds a pair of illumination parts, and a wiring connecting the pair of illumination parts is arranged in a groove of the holding portion.

8. The work machine according to claim 1, wherein a split housing is provided on an upper side of the motor housing, and the split housing is configured to be splittable in a direction orthogonal to the up-down direction.

9. The work machine according to claim 8, wherein a controller that controls turning on and off of the illumination part is provided in the split housing.

10. The work machine according to claim 8, wherein a battery that supplies electric power to the illumination part is detachably provided in the split housing.

11. The work machine according to claim 1, wherein when viewed along the up-down direction, the illumination part is proximate to one of the columns.

12. The work machine according to claim 1, wherein the holding portion extends from an inside of the motor housing to an inside of the end bracket.

13. The work machine according to claim 1, further comprising a controller that controls turning on and off of the illumination part, wherein the illumination part includes a first illumination part and a second illumination part, wherein the holding portion has a first holding part holding the first illumination part and a second holding part holding the second illumination part, wherein the first illumination part is electrically connected to the controller by a first lead wire, and the second illumination part is electrically connected to the controller by a second wire.

14. The work machine according to claim 1, wherein the illumination part includes a substrate and a LED mounted on the substrate, the holding portion holding the substrate so that the substrate intersects the up-down direction.

15. The work machine according to claim 14, further comprising a controller that controls turning on and off of the illumination part, wherein the holding portion has a slit, the illumination part is electrically connected to the controller by a lead wire passing through the slit.

16. The work machine according to claim 15, wherein movement of the lead wire is restricted by the slit.

17. A work machine, comprising:

a motor comprising a rotating shaft extending along an up-down direction, a rotor configured to be integrally rotatable on the rotating shaft, and a stator arranged on a radially outer side of the rotor;

a fan provided on the rotating shaft and arranged below the stator;

a motor housing accommodating the motor;

a tip tool attached to a lower end of the rotating shaft;

a pair of columns, having a cylindrical shape extending along the up-down direction;

an end bracket, configured separately from the motor housing and connected to a lower portion of the motor housing the end bracket holding a bearing for supporting the rotating shaft of the motor and accommodating at least a part of the pair of columns;

a right handle and a left handle, fixed to a right side and a left side of the end bracket respectively;

a switch circuit unit, configured to be operated by an operator to drive the motor the switch circuit unit disposed on one of the right handle or the left handle;

a base, fixed to the pair of columns;

an illumination part comprising a light source that irradiates emitted light toward a periphery of the tip tool; and a holding portion holding the illumination part, wherein a wall portion extending along the up-down direction is provided at a radially outer side of the fan in the end bracket, wherein the end bracket has an illumination hole penetrating the end bracket in the up-down direction, the illumination hole being provided at a radially outer side of the wall portion, wherein the holding portion extends from a high position above the fan to a low position below the fan, and irradiates the light from a lower end of the holding portion toward the periphery of the tip tool, and wherein the holding portion is provided at a radially outer side of the wall portion, and the lower end of the holding portion is arranged below the fan and is inserted in the illumination hole.

18. A work machine, comprising:

a motor comprising a rotating shaft extending along an up-down direction, a rotor configured to be integrally rotatable on the rotating shaft, and a stator arranged on a radially outer side of the rotor;

a centrifugal fan provided on the rotating shaft and arranged below the stator;

a motor housing accommodating the motor;

a tip tool attached to a lower end of the rotating shaft;

a pair of columns, having a cylindrical shape extending along the up-down direction;

an end bracket, configured separately from the motor housing and connected to a lower portion of the motor housing the end bracket holding a bearing for supporting the rotating shaft of the motor and accommodating at least a part of the pair of columns;

a right handle and a left handle, fixed to a right side and a left side of the end bracket respectively;

a switch circuit unit, configured to be operated by an operator to drive the motor the switch circuit unit disposed on one of the right handle or the left handle;

a base, fixed to the pair of columns;

an illumination part comprising a light source that irradiates emitted light toward a periphery of the tip tool; and a holding member holding the illumination part, wherein the holding member comprises:

a first portion extending along the up-down direction, a second portion connected to the first portion, and an extension portion connected to the first portion, the extension portion extending downward and holding the illumination part, wherein the second portion has a through hole opening along the up-down direction, the through hole opening being smaller than an outer diameter of the centrifugal fan, and wherein an air flow generated by the fan is guided by the first portion and the second portion, and a lower end of the extension portion irradiates the light to the periphery of the tip tool.

* * * * *